US010310838B2

(12) United States Patent
Kurosawa et al.

(10) Patent No.: US 10,310,838 B2
(45) Date of Patent: Jun. 4, 2019

(54) VEHICLE-MOUNTED PROGRAM WRITING DEVICE

(71) Applicant: Hitachi Automotive Systems, Ltd., Hitachinaka-shi, Ibaraki (JP)

(72) Inventors: Kenichi Kurosawa, Hitachinaka (JP); Fumiharu Nakahara, Hitachinaka (JP)

(73) Assignee: HITACHI AUTOMOTIVE SYSTEMS, LTD., Hitachinaka-shi (JP)

(*) Notice: Subject to any disclaimer, the term of this patent is extended or adjusted under 35 U.S.C. 154(b) by 264 days.

(21) Appl. No.: 15/310,633

(22) PCT Filed: Jun. 8, 2015

(86) PCT No.: PCT/JP2015/066432
§ 371 (c)(1),
(2) Date: Nov. 11, 2016

(87) PCT Pub. No.: WO2015/194406
PCT Pub. Date: Dec. 23, 2015

(65) Prior Publication Data
US 2017/0075678 A1  Mar. 16, 2017

(30) Foreign Application Priority Data

Jun. 18, 2014 (JP) ................... 2014-124891

(51) Int. Cl.
G06F 9/445 (2018.01)
G06F 8/65 (2018.01)
(Continued)

(52) U.S. Cl.
CPC ............... *G06F 8/65* (2013.01); *B60R 16/02* (2013.01); *G06F 1/26* (2013.01); *H04W 4/00* (2013.01); *H04W 84/042* (2013.01)

(58) Field of Classification Search
USPC ................................. 717/168, 178
See application file for complete search history.

(56) References Cited

U.S. PATENT DOCUMENTS 8,417,442 B2 * 4/2013 Johnson ............... G08G 1/0104
701/118
2004/0002793 A1  1/2004 Tachibana et al.
(Continued)

FOREIGN PATENT DOCUMENTS

EP  2 602 157 A1  6/2013
JP  H10-110946 A  4/1998
(Continued)

OTHER PUBLICATIONS

Japanese Office Action issued in corresponding application No. 2016-529247 dated Oct. 31, 2017, with machine translation.
(Continued)

*Primary Examiner* — Chuck O Kendall
(74) *Attorney, Agent, or Firm* — Foley & Lardner LLP

(57) ABSTRACT

Provided is a program writing device that reliably performs an updating process of data by means of a control program or the like in a safe manner and without inconveniencing the owner of a vehicle or a driver using the vehicle. The program writing device is provided with a plurality of vehicle-mounted control devices, which control the operation of apparatuses mounted in the vehicle by means of control programs, and a relay device that receives updated program data including an updated program, updated data, or the like for the vehicle-mounted devices and transmitted from an external center, and stores the result in memory, the vehicle-mounted control devices and relay device being connected via a vehicle-mounted network, wherein the relay device is provided with a battery voltage checking circuit, an unloaded and a load-connected battery voltage check are performed by the battery voltage check circuit before writing the updated program or updated data to the vehicle-mounted control devices, and writing is executed when the battery voltage when unloaded is at least a first reference (Continued)

voltage or when connected to a load is at least a second reference voltage, and in other cases writing is not executed.

34 Claims, 26 Drawing Sheets

(51) Int. Cl.
    *B60R 16/02*     (2006.01)
    *H04W 4/00*     (2018.01)
    *G06F 1/26*     (2006.01)
    *H04W 84/04*     (2009.01)

(56) References Cited

U.S. PATENT DOCUMENTS

| | | |
|---|---|---|
| 2007/0005204 A1 | 1/2007 | Yamamoto et al. |
| 2007/0100513 A1 | 5/2007 | Asano |
| 2011/0307882 A1 | 12/2011 | Shiba |
| 2013/0197712 A1 | 8/2013 | Matsuura et al. |
| 2014/0358367 A1* | 12/2014 | Copeland ............... B60R 16/03 701/36 |
| 2015/0301822 A1 | 10/2015 | Takahashi et al. |

FOREIGN PATENT DOCUMENTS

| | | |
|---|---|---|
| JP | 2003-191803 A | 7/2003 |
| JP | 2007-011734 A | 1/2007 |
| JP | 4361902 B2 | 11/2009 |
| JP | 2010-277432 A | 12/2010 |
| JP | 4593095 B2 | 12/2010 |
| JP | 2014-106875 A | 6/2014 |
| WO | WO-2010/113348 A | 10/2010 |
| WO | WO 2012/017719 A1 | 2/2012 |

OTHER PUBLICATIONS

Extended European Search Report issued in corresponding application No. 15810231.9 dated Jan. 24, 2018.
Written Opinion of the International Search Authority issued in application No. PCT/JP2015/066432 dated Sep. 1, 2015.

* cited by examiner

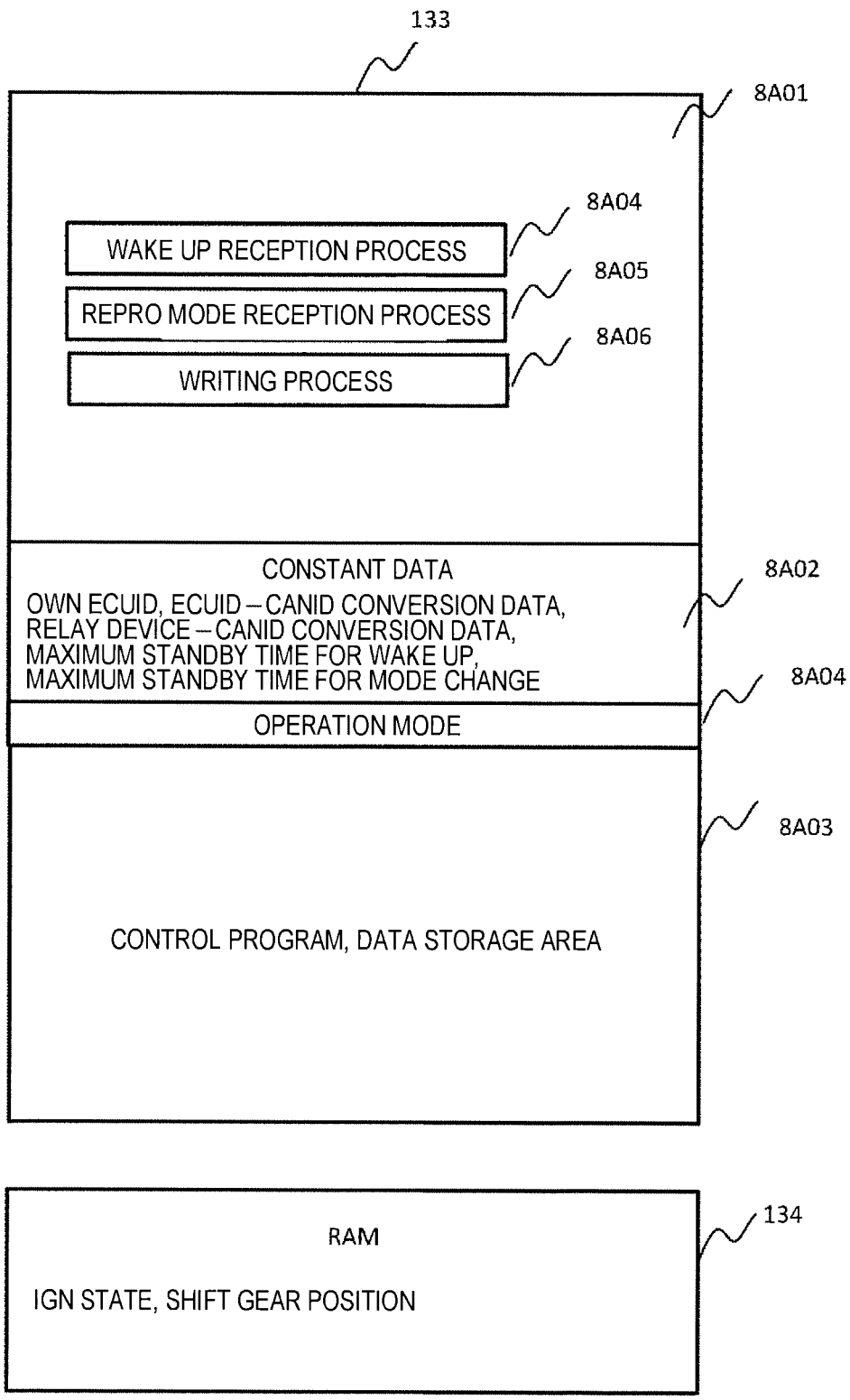

VEHICLE-MOUNTED PROGRAM WRITING DEVICE

TECHNICAL FIELD

The present invention relates to an embedded control device that controls an electronic device that is mounted in a vehicle, and particularly to, a writing device of a vehicle-mounted program.

BACKGROUND ART

A control program, which describes a control operation of a vehicle-mounted control device that is mounted in a vehicle, is stored in a nonvolatile memory such as a flash memory in a microcomputer. In addition, data such as an initial value that is used in the control program is also stored in the nonvolatile memory. Typically, the program or data is not changed after putting a vehicle on the market. However, updating of the control program or data is performed when a bug is detected, or so as to provide a better service.

With regard to an update process of the control program or data of the vehicle, the vehicle is brought into a shop, and rewriting is performed in the shot. However, recently, a method of carrying out the rewriting through a wireless communication over a mobile telephone network that is an infrastructure on an outer side of the vehicle.

For example, in PTL 1, an information management base station apparatus on an outer side of a vehicle transmits an update request to a stopped vehicle through a wireless communication device that is mounted in the vehicle. The vehicle, which receives the update request, wakes up from a sleep state and activates a vehicle-mounted control device that is mounted in the vehicle, and writes an update program, which is transmitted from the information management base station, in the vehicle-mounted control device.

In addition, PTL 2 discloses the following configuration. An external tool and a writing device that is mounted in a vehicle are connected through a communication cable. An update program, which is transmitted from the external tool, is stored in the writing device. The update program is written in the vehicle-mounted control device from the writing device in a state in which the communication cable is removed. In PTL 2, a communication is not necessary during writing, and thus the communication cable can be connected to another vehicle to store the update program in the recording device. As a result, with regard to writing time, shortening of the writing time is realized when considering that the writing is possible without a communication with an outer side and thus writing time can be shortened, and the writing process with respect to the vehicle and a storage process of the update program with respect to the other vehicle through the communication cable can be simultaneously executed.

CITATION LIST

Patent Literature

PTL 1: JP 4361902 B2
PTL 2: JP 4593095 B2

SUMMARY OF INVENTION

Technical Problem

However, in PTL 1, a unit, which stores the update program in advance, is not provided. Therefore, time necessary for writing the update program is the sum of update program transmission time with respect to the vehicle-mounted control device form the information management base station apparatus and writing time with respect to the vehicle-mounted control device. As a result, there is a problem in that time is taken. In addition, an engine is not activated, and thus battery charging by an alternator cannot be performed. Accordingly, when power shortage occurs during writing, updating of the program is stopped, and thus there is a problem that an operation failure of the vehicle-mounted control device occurs. In a case where writing time is taken, particularly, there is a high possibility in that a battery may be lack of capacity, and this is a serious problem.

In addition, PTL 2 describes a configuration in which writing is performed when an ignition is in an on-state, but does not describe a configuration in which the writing is performed in a state in which an engine is activated. Accordingly, as is the case with PTL 1, there is a possibility in that writing interruption may occur due to battery capacity shortage during execution of the writing.

As described above, in the update process of the control program or data of the vehicle-mounted control device that is mounted in the vehicle, it is necessary for the vehicle to be brought into a shop. In addition, there is also suggested means for updating the control program or data of the vehicle-mounted control device by utilizing a wireless communications over a mobile telephone network without bringing the vehicle into the shop. However, a problem to be solved is to update the control program or data of the vehicle-mounted control device without causing inconvenience for an owner of a vehicle or a driver who uses a vehicle to a certain extent and in a stable manner.

Particularly, in a case where the update process is executed in a home parking lot other than the shop under a situation in which a mechanic specialized in the vehicle is not present, as described above, there is a possibility in that writing stoppage may occur due to capacity shortage of a vehicle-mounted battery. Accordingly, a problem to be solved is to determine whether or not the battery capacity is sufficient for execution of the update process.

An object of the invention is to provide a program writing device that reliably performs an update process of a control program or data without causing inconvenience for an owner of a vehicle or a driver who uses a vehicle and in a stable manner.

Solution to Problem

A representative summery of the invention disclosed in this specification is as follows. A program writing device, includes: a plurality of vehicle-mounted control devices which control an operation of a device that is mounted in a vehicle with a control program; and a relay device that receives update program data which includes an update program, update data, and the like of the vehicle-mounted control device and is transmitted from an external center, and stores the update program data in a memory, wherein the vehicle-mounted control devices and the relay device are connected through a vehicle-mounted network, the relay device includes a battery voltage check circuit, battery voltage check with respect to a no-load state and a load-connected state is performed with the battery voltage check circuit before writing the update program and the update data in the vehicle-mounted control devices, and in a case where a battery voltage is equal to or greater than a first reference voltage in the no-load state, or equal to or greater than a second reference voltage in the load-connected state, writing is performed and the writing is not performed in the other cases.

Advantageous Effects of Invention

According to the invention, it is possible to provide a program writing device that reliably performs an update process of a control program or data without causing inconvenience for an owner of a vehicle or a driver who uses a vehicle and in a stable manner.

BRIEF DESCRIPTION OF DRAWINGS

FIG. 8A is a configuration diagram of a memory of the vehicle-mounted control device.

DESCRIPTION OF EMBODIMENTS

Figure 1:
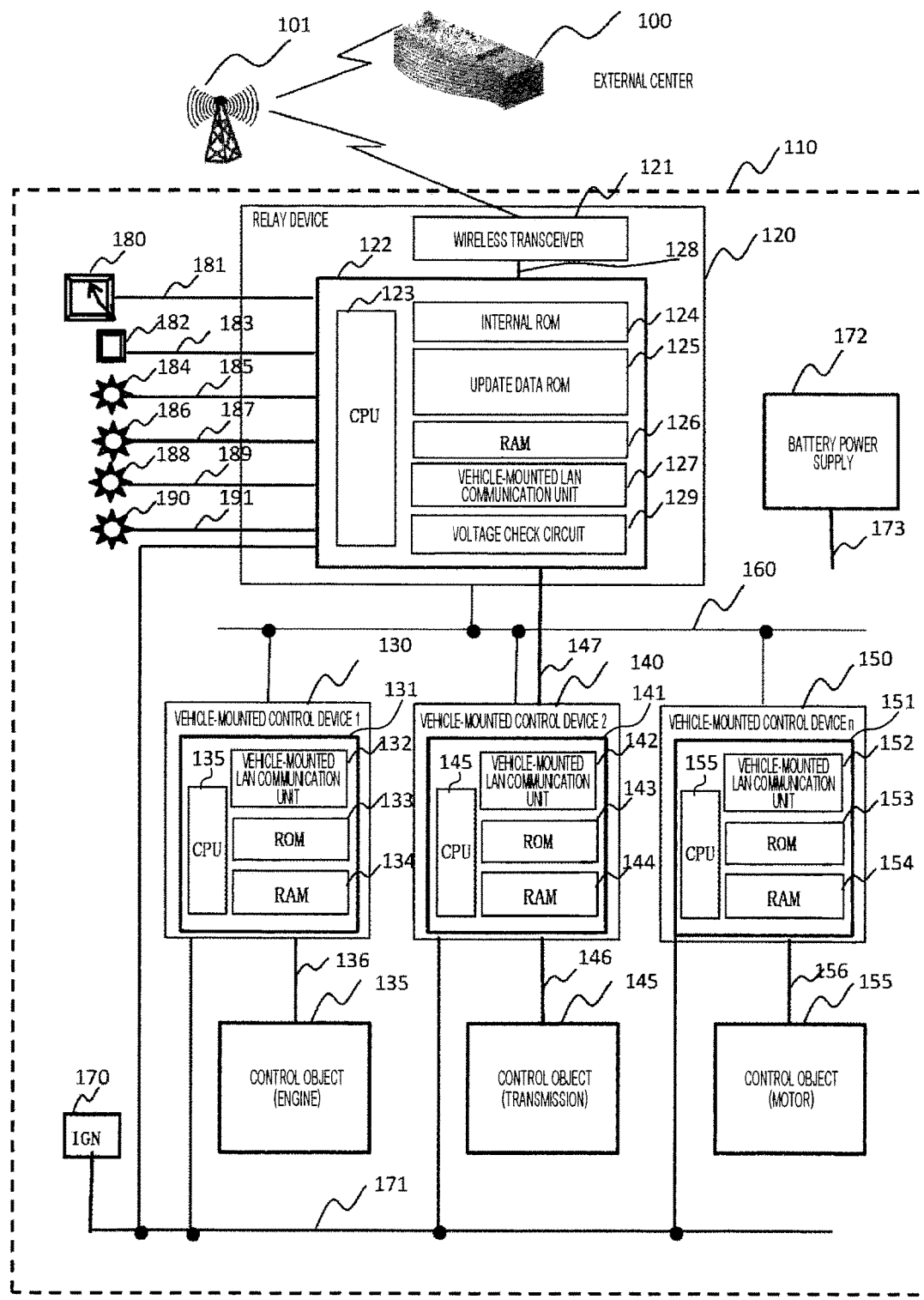
FIG. 1 is an overall configuration diagram of a vehicle-mounted program writing device that has a voltage check function.

It is necessary to write an update program and update data in a vehicle-mounted control device in a time zone, at which a vehicle is not used, in a short time and in a stable manner in order for a driver not to be inconvenient. First, the invention has been made on the assumption that update program data, which is wireless transmitted from an external center, of the vehicle-mounted control device is acquired in a case where an ignition is in an on-state, and the update program data is stored in a relay device so as to realize stability and writing time savings. The reason for this is as follows. First, since the update program data is wirelessly received, when a vehicle is parked at a location such a spot blocked by a building and an indoor parking lot in which electric waves are not reached, the update program data may not be received. Accordingly, when a relay device receives the update program data during travelling of the vehicle and the like when the ignition is in the on-state, it is possible to receive the update program data in a more reliable and stable manner. Accordingly, since the update program data is received in a state in which an engine is activated, and battery charging from an alternator is performed. Second, when the update program data is stored in the relay device in the vehicle and then an update program and update data are written in the vehicle-mounted control device from the relay device at an arbitrary time zone, it is possible to further reduce recording time in comparison to a configuration in which the update program and the update data are directly written in the vehicle-mounted control device from the external center in a wireless manner.

In the invention, means for stably writing the update program and the update data in the vehicle-mounted control device in a time zone, at which a driver does not uses a vehicle, is devised on the assumption of the above-described configuration. Consideration will be given of a program update sequence before description of the means of the invention. First, program update of the vehicle-mounted control device cannot be executed without an agreement of a vehicle owner. Therefore, it is necessary to confirm the agreement for the program update or a first time zone in which the vehicle is not used with a telephone or a mail in advance. Here, the first time zone represents a time zone at an appropriate date designated by the vehicle owner, and an agreed time zone in which the program update is permitted. Accordingly, the vehicle owner may desire the program update at a home parking lot in a time zone of two to three at night time. However, in a case where an external center plans to transmit the update program and the update data to another vehicle in the time zone, the time zone may be changed to another time zone through adjustment with the vehicle owner. In addition, another vehicle owner may desire to perform the program update by oneself at an appropriate time without designating a time zone. As described above, in a case where a time zone is designated, a time zone at night time is assumed, a driver does not get on a vehicle, and it is necessary to realize writing of the update program when the ignition is in an off-state. This case is referred to as a first case. On the other hand, the case in which the driver executes the program update by oneself at an appropriate time without designating the time zone is referred to a second case. Hereinafter, description will be given of means for realizing the first case and the second case according to the invention.

First, description will be given of a situation in which program update is difficult during battery charging from an alternator after activating an engine. Here, "during battery charging" represents a state in which the engine operates, and a control program of the vehicle-mounted control device that controls the engine is executed. That is, the control program in execution is read by a microcomputer, and it enters a state in which a command string that is read is in execution. Accordingly, when a part of the control program is rewritten as the update program, an operation failure is caused. As described above, it is difficult to perform the program update during an operation of the vehicle-mounted control device that controls the engine. In consideration of the above description, in the invention, means for realizing the first case and the second case is devised on the assumption that battery capacity is grasped before execution of the program update, and checking is made for whether or not battery capacity remains to an extent in which the program update is possible.

Hereinafter, overviews of respective aspects will be described.

In a first aspect, the relay device performs battery voltage check with respect to a no-load state and a load-connected state with a voltage check circuit provided to the relay device before writing the update program and the update data in the vehicle-mounted control device. The relay device performs the writing in a case where a battery voltage is equal to or a first reference voltage in the no-load state or equal to or greater than a second reference voltage in the load-connected state, and does not perform the writing in the other cases. A lead battery that is mounted in a vehicle has characteristics in which when battery capacity decreases, internal resistance increases and voltage drop increases. Accordingly, even in a battery that has a high voltage in a no-load state, capacity may be small. According to this, determination is made on whether or not the battery voltage is equal to or greater than the second reference voltage in the load-connected state. On the other hand, in a case where a very high voltage is output in the no-load state, it can be said that the internal resistance is small. Accordingly, when the battery voltage is equal to or greater than the first reference voltage, it can be determined that the battery capacity is sufficient. Accordingly, whether or not the battery voltage in the no-load state is equal to or greater than the first reference voltage is also added to determination conditions. Apparently, the first reference voltage is a voltage that is greater than the second reference voltage.

In a second aspect, the relay device includes a battery voltage abnormality display unit. From a result of the battery voltage check in the no-load state and the load-connected state with the battery voltage check circuit, in a case where the battery voltage is equal to or less than the first reference voltage and equal to or less than the second reference voltage, the battery voltage abnormality display unit is turned on. The above-described configuration is intended to notify a driver of abnormality in the battery, and thus the display unit may be flickered.

In a third aspect, the relay device includes a battery voltage normality display unit. From a result of the battery voltage check in the no-load state and the load-connected state with the battery voltage check circuit, in a case where the battery voltage is equal to or greater than the first reference voltage or equal to or greater than the second reference voltage, the battery voltage normality display unit is turned on. This configuration is intended to notify a driver of normality in the battery.

Next, description will be given of realizing means according to a first case. In this case, a driver does not get on a vehicle, and thus program update is basically executed in a time zone (referred to as "first time zone") that is desired by a vehicle owner on the basis of a command transmitted from the external center.

In a fourth aspect, after update program data is stored in the relay device from the external center before the first time zone in a battery charging state during activation of an engine, the relay device performs, first, the battery voltage check in the no-load state and the load-connected state when receiving a writing initiation command transmitted from the external center in a range of the first time zone. From a result of the battery voltage check, in a case where the battery voltage is equal to or greater than the first reference voltage or equal to or greater than the second reference voltage, the relay device wakes up the vehicle-mounted control device for transition to a repro mode (program rewriting mode), and performs writing of the update program and the update data in the vehicle-mounted control device in the first time zone on the basis of the repro mode transition notification from the vehicle-mounted control device, and whether or not the update program data, which is stored in the memory, of the vehicle-mounted control device is present. According to this aspect, update of the program and the data of the vehicle-mounted control device can be stably completed in a time zone in which a vehicle owner does not feel inconvenient.

In a fifth aspect according to the fourth aspect, the battery voltage check in the no-load state and the load-connected state in a case where a writing initiation command, which is transmitted from the external center in a range of the first time zone, is received, and an ignition is turned off, and writing of the update program and the update data are executed in the first time zone.

In a sixth aspect, when receiving update program data including a second time zone from the external center, and current time from a vehicle-mounted timepiece is in a range of the second time zone, a writing initiation command is executed. That is, according to this aspect, time at which the writing initiation command is received is obtained by reading the timepiece mounted in a vehicle, and it is possible to determine whether or not the time is in a range of the second time zone through comparison with the second time zone in the update program data received already. Accordingly, when the time is in the range, battery voltage check in the no-load state and the load-connected state is performed, and writing is initiated when the battery voltage is equal to or greater than a reference voltage. First, a wake up pattern is transmitted to the vehicle-mounted control device that is connected to a vehicle-mounted network to wake up the vehicle-mounted control device. Then, a repro mode transition command is transmitted to the vehicle-mounted control device. After notification of transition of the vehicle-mounted control device to the repro mode, the process of writing the update program and the update data is executed in the second time zone. As described above, according to this aspect, the battery voltage is confirmed in the second time zone (that is, the first time zone and the second time zone are set to be the same) that is a promised to the vehicle owner, and thus writing is stably and reliably performed.

In a seventh aspect according to the sixth aspect, in a case where the ignition is in an off-state, and current time obtained from the vehicle-mounted timepiece is in a range of the second time zone, voltage check is performed, and writing is executed in the second time zone when the battery voltage is equal to or greater than a reference voltage.

In an eighth aspect, a memory storage completion display unit is provided in a vehicle, and in a case where the relay device completes storage of the update program data transmitted from the external center, the memory storage completion display unit is turned on. When assuming that the update program data with respect to the vehicle is transmitted before several days, if the display unit is turned on, a driver can recognize that it is ready to perform program update, and thus it is possible to give a sense of security.

In a ninth aspect, a writing completion display unit is provided in a vehicle, and after completing writing of stored update program data in the vehicle-mounted control device, the display unit is turned on and the external center is notified of completion of writing. According to this, for example, the writing completion display unit is turned on in the next morning, a driver can confirm the completion, and thus the drive can have peace of mind. In addition, the external center also can confirm the completion.

Next, description will be given of realizing means according to a second case. This case is a case in which a driver gets on a vehicle.

In a tenth aspect, a memory storage completion display unit with which a driver can confirm completion of storage of the update program data, a writing initiation command button configured to give a writing initiation command by a driver, and a writing completion display unit that indicates writing completion are provided. When the driver confirms turning-on of the memory storage completion display unit, and turns on the writing initiation command button at time convenient for the driver, the relay device performs battery voltage check in the no-load state and the load-connected state. From a result thereof, when the battery voltage is equal to or greater than a reference voltage, writing in the vehicle-mounted control device is performed, and writing completion is notified through turning-on of the writing completion display unit. As described above, when two display unit and one button are provided, the driver can reliably execute the writing with security.

In an eleventh aspect according to the tenth aspect, in a case where the ignition is in an on-state, a shift gear position of a vehicle is parking, and the writing initiation command button is turned on, the voltage check is performed, and the writing is executed when the battery voltage is equal to or greater than a reference voltage.

In a twelfth aspect, there is provided means for executing writing in a first time zone that is promised to a vehicle owner because even when a driver gets on the vehicle the driver may not be the owner. So as to execute the writing in the first time zone that is promised to the vehicle owner, second time zone data (the second time zone is set to be the same as the first time zone) is set to the update program data, and is transmitted to the relay device. The relay device checks whether or not time at which the writing initiation command button enters an on-state is in a range of the second time zone by using a timepiece in the vehicle. From a result thereof, when the time is in the range, and the memory storage completion display unit is turned on, the relay device performs battery voltage check in the no-load state and the load-connected state. From a result thereof, when the battery voltage is equal to or greater than a reference voltage, the relay device executes writing in the vehicle-mounted control device in the second time zone. After completing the writing, the relay device turns on the writing completion display unit to notify the driver of the writing completion.

In a thirteenth aspect according to the twelfth aspect, when the ignition is in an on-state, the shift gear position of the vehicle is parking, turning-on of the writing initiation command button is detected in the second time zone, the battery voltage check is performed, and when the battery voltage is equal to or greater than a reference voltage, writing is executed in the second time zone.

A fourteenth aspect relates to means in a case where as one of vehicle-mounted control devices, a navigation device is set as an object. Battery voltage check is performed before writing map data instead of the update program data in the navigation device, and when the battery voltage is equal to or greater than a reference voltage, writing is executed.

As described above, according to the invention, even in a case where a driver gets on a vehicle and a case where the driver does not get on the vehicle, writing initiation is executed in a time zone that is promised in advance. When the driver presses the writing initiation command button at a convenient time, the battery voltage check in the no-load state and the load-connected state is performed. From a result thereof, when it is confirmed that the battery voltage is equal to or greater than the reference voltage, it is possible to stably realize a process of writing the update program or the update map data.

In a fifteenth aspect, it is not necessary for a battery voltage check circuit to be embedded in the relay device. A battery voltage check device, in which the battery voltage check circuit is embedded, is connected to the relay device through a vehicle-mounted network, and the relay device is notified of a battery voltage check result detected by the battery voltage check device through the vehicle-mounted network. As a result thereof, the relay device can stably execute the writing process with respect to the vehicle-mounted control device on the basis of the battery voltage check result received from the vehicle-mounted network.

Hereinafter, description will be made in detail with reference to respective examples.

Example 1

First, description will be given of a hardware configuration, a necessary software configuration, and a data configuration which realize an example of the invention, and then description will be given of detailed examples of the invention.

As illustrated in FIG. 1, an external center 100 has a function of wirelessly transmitting update program data to a vehicle 110, and receiving a writing completion result from the vehicle. A wireless relay station 101 relays wireless data between the external center 100 and the vehicle 110. The vehicle 110 is provided with a relay device 120 that has an update program data storing function and a writing function with respect to a vehicle-mounted control device, a vehicle-mounted control device 130 that controls a control object (engine) 135, a vehicle-mounted control device 140 that controls a control object (transmission) 145, a vehicle-mounted control device 150 that controls a control object (motor) 155, a battery power supply 172 that is mounted in the vehicle, an ignition switch IGN 170 that supplies battery power to an electronic device that is mounted in the vehicle, a timepiece 180, a writing initiation command button 182, a memory storage completion display unit 184, a writing completion display unit 186, a battery voltage abnormality display unit 188, and a battery voltage normality display unit 190. The relay device 120 includes a wireless transceiver 121 that transmits and receives data to and from the external center 100, and a microcomputer 122. In addition, the relay device 120 is connected to a vehicle-mounted network 160, is connected to the timepiece 180 through a signal line 181, is connected to the writing initiation command button 182 through a signal line 183, is connected to the memory storage completion display unit 184 through a signal line 185, is connected to the writing completion display unit 186 through a signal line 187, is connected to the battery voltage abnormality display unit 188 through a signal line 189, and is connected to the battery voltage normality display unit 190 through a signal line 191. Here, the writing initiation command button 182, the memory storage completion display unit 184, the writing completion display unit 186, the battery voltage abnormality display unit 188, and the battery voltage normality display unit 190 are individually provided for easy understanding of explanation, but operation and display thereof may be realized by one device such as a touch panel-attached display unit. The wireless transceiver 121 is connected to the microcomputer 122 through a signal line 128. The microcomputer 122 includes a CPU 123 including an operation unit, an internal ROM 124 that stores a program configured to control an operation of the microcomputer, an update data ROM 125 that stores update program data, a RAM 126, a vehicle-mounted LAN communication unit 127 that performs a protocol process of the vehicle-mounted network, and a voltage check circuit 129 that is one aspect of the invention.

The vehicle-mounted network 160 is a vehicle-mounted network that connects the relay device 120, and the vehicle-mounted control devices 130, 140, and 150. The battery power supply 172 supplies power to the entirety of vehicle-mounted electronic devices such as the relay device 120, and the vehicle-mounted control devices 130, 140, and 150 through a power line 173. In addition, the ignition 170 is a signal for activation of a vehicle-mounted electronic device, and is connected to the relay device 120, and the vehicle-mounted control devices 130, 140, and 150 through a signal line 171. The ignition 170 is turned on, an electronic device that is connected thereto is activated, and the ignition 170 enters a START state, an engine starts to operate. The vehicle-mounted control device 130 is connected to the vehicle-mounted network 160, and controls the engine 135 that is a control object through a signal line 136. The microcomputer 131 controls an operation of the vehicle-mounted control device 130, and a vehicle-mounted LAN communication unit 132 is connected to the vehicle-mounted network 160. A ROM 133 is a flash memory that stores a program and data for controlling the control object 135, and the RAM 134 is an SRAM.

The vehicle-mounted control device 140 is connected to the vehicle-mounted network 160, and controls the transmission 145 that is a control object through a signal line 146. A microcomputer 141 controls an operation of the vehicle-mounted control device 140, and vehicle-mounted LAN communication unit 142 is connected to the vehicle-mounted network 160. A ROM 143 is a flash memory that stores a program and data for controlling the control object 145, and a RAM 144 is an SRAM. The vehicle-mounted control device 140 outputs a shift gear position signal 147 of the transmission to the relay device 120.

The vehicle-mounted control device 150 is connected to the vehicle-mounted network 160, and controls the motor 155 that is a control object through a signal line 156. A microcomputer 151 controls an operation of the vehicle-mounted control device 150, and a vehicle-mounted LAN communication unit 152 is connected to the vehicle-mounted network 160. A ROM 153 is a flash memory that stores a program and data for controlling the control object 155, and a RAM 154 is an SRAM.

Figure 2:
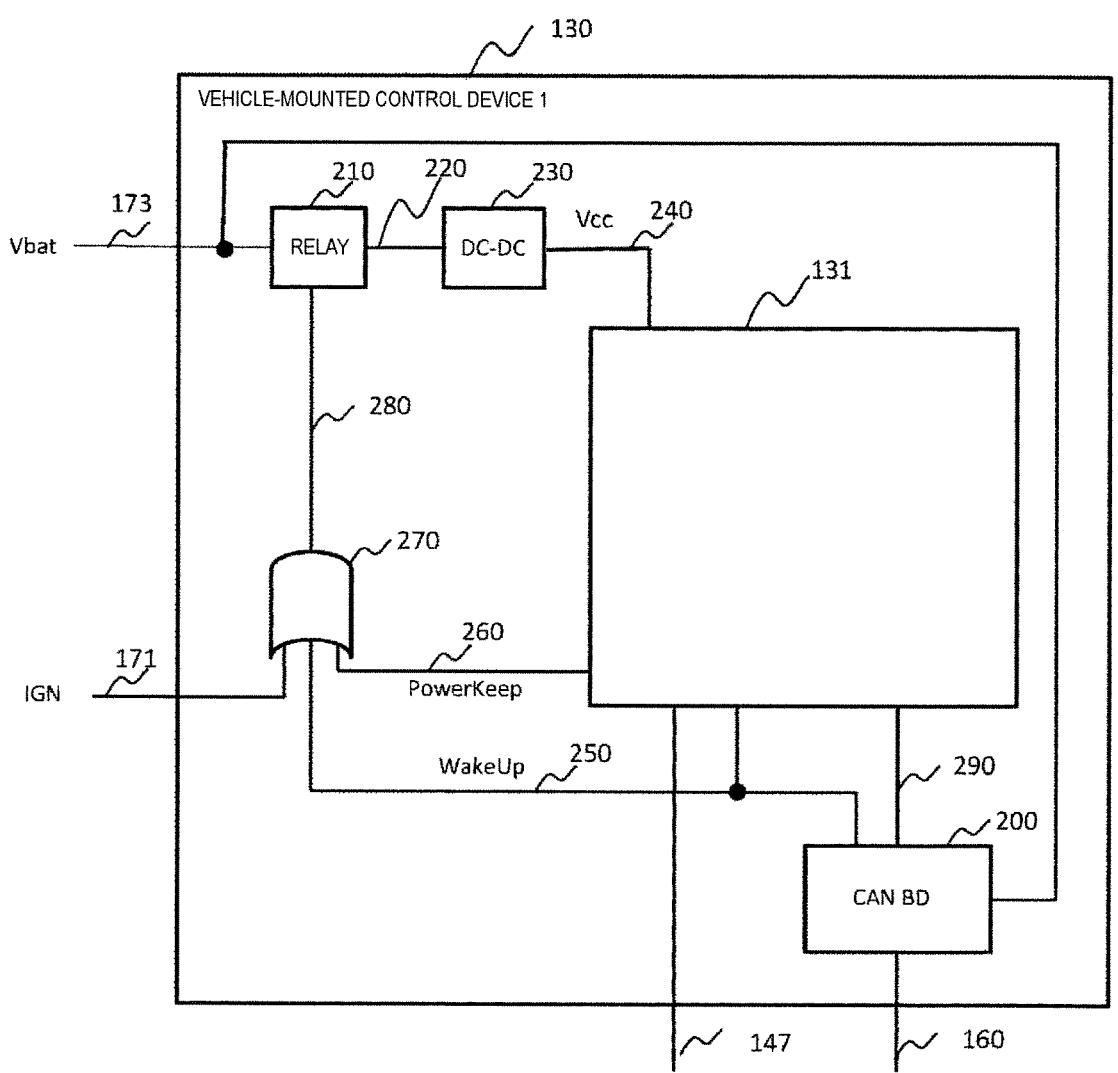
FIG. 2 is a configuration diagram of the vehicle-mounted control device.

Next, description will be given of a circuit in accordance with activation of the vehicle-mounted control device 130 with reference to FIG. 2.

In this example, three vehicle-mounted control devices 130, 140, and 150 are provided, but circuits in accordance with activation thereof are the same as each other. Only a shift gear position signal 147 is a signal that is output from the vehicle-mounted control device 140 to the relay device 120. Accordingly, a circuit operation except for the signal 147 will be collectively described with reference to FIG. 2. Examples of an input of the vehicle-mounted control device 130 include a battery power line 173, an ignition signal line 171, and the vehicle-mounted network 160. When a relay circuit 210 is turned on, the battery power line 173 and a power line 220 are connected to each other, and thus battery power is supplied a DC-DC converter 230. The DC-DC converter 230 lowers a battery voltage to a microcomputer voltage and supplies the voltage to a power supply terminal 240 of the microcomputer. According to this, the microcomputer 131 is subjected to power-on-reset, and can be activated. Here, three signals are provided to turn on the relay circuit 210, and the signals will be described below.

A first signal is an ignition IGN signal 171, a second signal is a wake up detection signal WakeUp 250 of a driver IC CAN BD 200 of the vehicle-mounted network, and a third signal is a self-holding signal PowerKeep 260 of the microcomputer 131. The three signals are output to a signal 280 through an OR circuit 270 to control an on/off operation of the relay circuit 210. The wake up detection signal WakeUp 250 is a signal that enters an on-state when a wake up signal is received through the vehicle-mounted network 160. A wake up function is a function that is typically used in a vehicle, and is also supported in a CAN network or a FlexRay network. In addition, a signal line 290 is a signal which connects the driver IC CAN BD 200 of the vehicle-mounted network and the microcomputer 131, and is a signal line through which communication data exchange with the relay device 120 is performed.

Next, the self-holding signal PowerKeep 260 will be described. When the microcomputer 131 sets the signal to an on-state, from a circuit configuration, it can be seen that the relay circuit 210 can hold an on-state even though the ignition signal IGN 171 and the wake up detection signal WakeUp 250 enter an off-state. Accordingly, when an update program and update data are written in the flash memory ROM 133, if the signal is set to an on-state, the power of the microcomputer can be held, and thus it is possible to secure safety.

Figure 3:
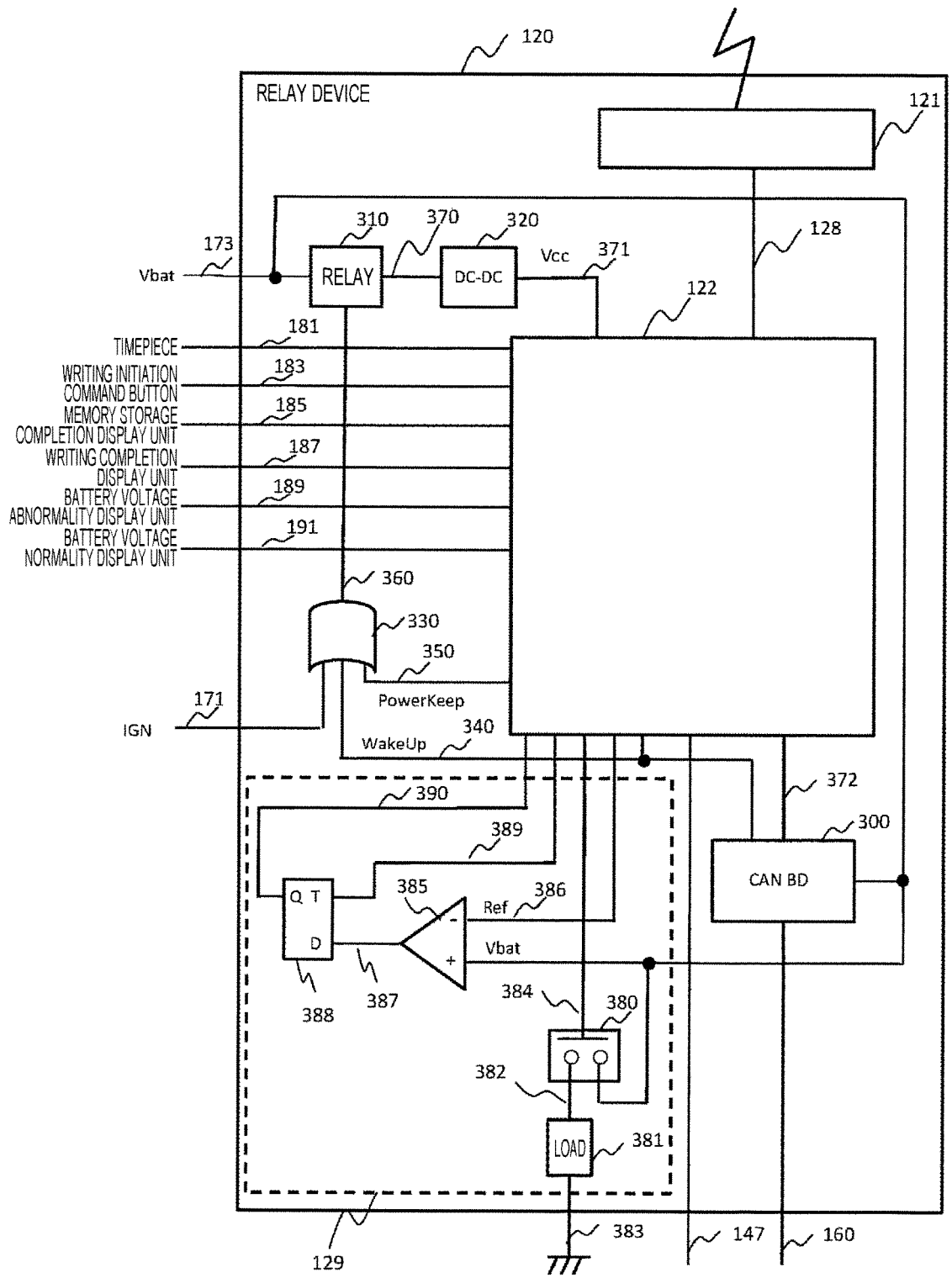
FIG. 3 is a configuration diagram of a relay device.

Next, description will be given of a circuit in accordance with activation of the relay device 120 with reference to FIG. 3.

Examples of an input of the relay device 120 includes the battery power line 173, the signal line 181 of the timepiece, the signal line 183 of the writing initiation command button, the signal line 185 of the memory storage completion display unit, the signal line 187 of the writing completion display unit, the signal line 189 of the battery voltage abnormality display unit, the signal line 191 of the battery voltage normality display unit, the ignition signal line 171, the shift gear position signal line 147, and the vehicle-mounted network 160. In addition, the wireless transceiver 121 is connected to the microcomputer 122 through the signal line 128. When a relay circuit 310 enters an on-state, the battery power line 173 and a power line 370 are connected to each other, and thus battery power is supplied to a DC-DC converter 320. The DC-DC converter 320 lowers the battery voltage to the microcomputer voltage and supplies the voltage to a power terminal 371 of the microcomputer. According to this, the microcomputer 122 is subjected to power-on-reset, and can be activated. Here, as is the case with the vehicle-mounted control device, three signals are provided to allow the relay circuit 310 to enter an on-state, and the signals will be described below.

A first signal is the ignition signal 171, a second signal is a wake up detection signal WakeUp 340 of a driver IC CAN BD 300 of the vehicle-mounted network, and a third signal is a self-holding signal PowerKeep 350 of the microcomputer 122. The three signals are output to a signal 360 through an OR circuit 330 to control an on/off operation of the relay circuit 310. The wake up detection signal WakeUp 340 is a signal that enters an on-state when a wake up signal is received through the vehicle-mounted network 160. A wake up function is a function that is typically used in a vehicle. In addition, a signal line 372 is a signal which connects the driver IC CAN BD 300 of the vehicle-mounted network and the microcomputer 122 to each other, and is a signal line through which communication data exchange with the vehicle-mounted control device is performed.

Next, the self-holding signal PowerKeep 350 will be described. When the microcomputer 122 sets the signal to an on-state, from a circuit configuration, it can be seen that the relay circuit 310 can hold an on-state from a circuit configuration even though the ignition signal 171 or wake up detection signal WakeUp 340 enters an off-state. Accordingly, when update program data is written in the update data ROM 125 of the flash memory, if the signal is set to an on-state, the power of the microcomputer 122 can be held, and thus it is possible to secure safety.

Next, detailed description will be given of the voltage check circuit 129 that is an aspect of the invention.

A load 381 is a pseudo-load that is constituted by a high-breakdown-voltage resistor, and an end thereof is connected to a ground through a power line 383. The load 381 is connected to one terminal of a relay circuit 380 through a power line 382, and the battery power line 173 is connected to another terminal. In addition, still another terminal is connected to the microcomputer 122 through a signal line 384. An analog signal line 386 of a reference voltage that is output from the microcomputer 122 is connected one terminal of a voltage detection circuit 385, and the battery power line 173 is connected another terminal of the voltage detection circuit 385. In addition, an output terminal of the voltage detection circuit 385 is connected to a D terminal of a flip-flop circuit 388 through a signal line 387. In addition, a signal line 389 of a voltage observation pulse that is output from the microcomputer 122 is connected to a T terminal of the flip-flop circuit 388. An output terminal Q of the flip-flop circuit 388 is connected to the microcomputer 122 though a signal line 390.

An operation of the above-described voltage check circuit 129 will be described in detail with reference to FIG. 24 and FIG. 25.

Figure 24:
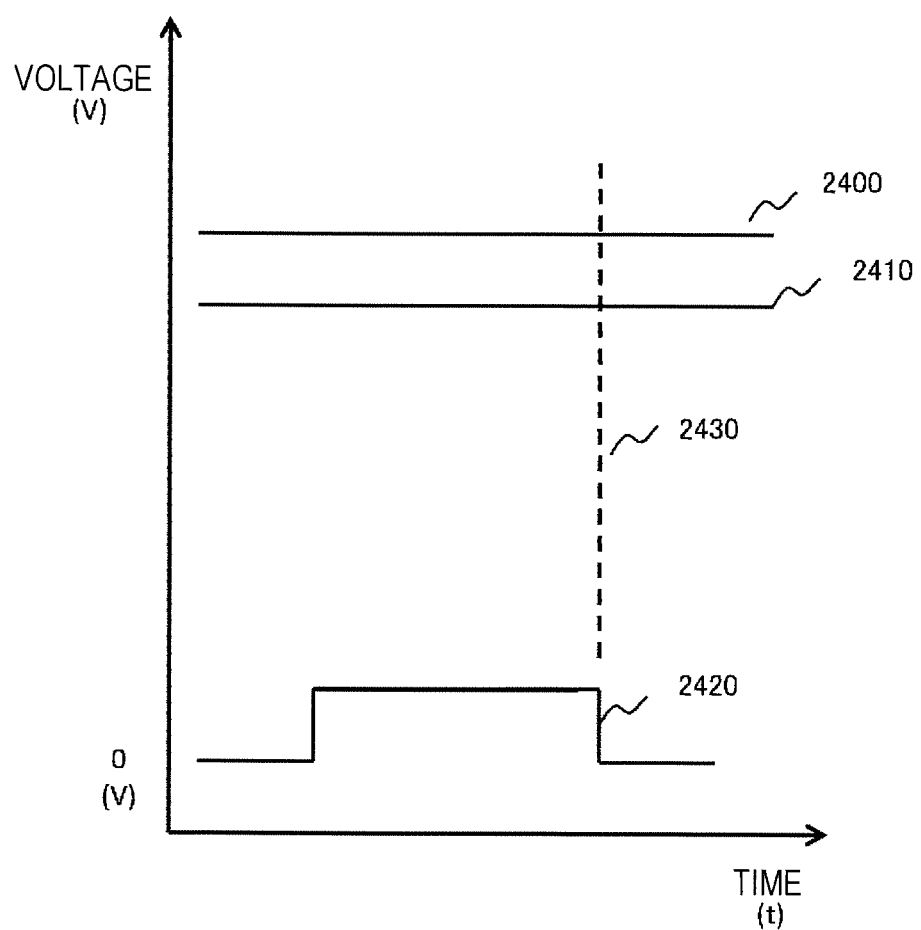
FIG. 24 is a diagram illustrating a relationship between a voltage observation pulse 2420 and a battery voltage waveform 2400 in a no-load state.
Figure 25:
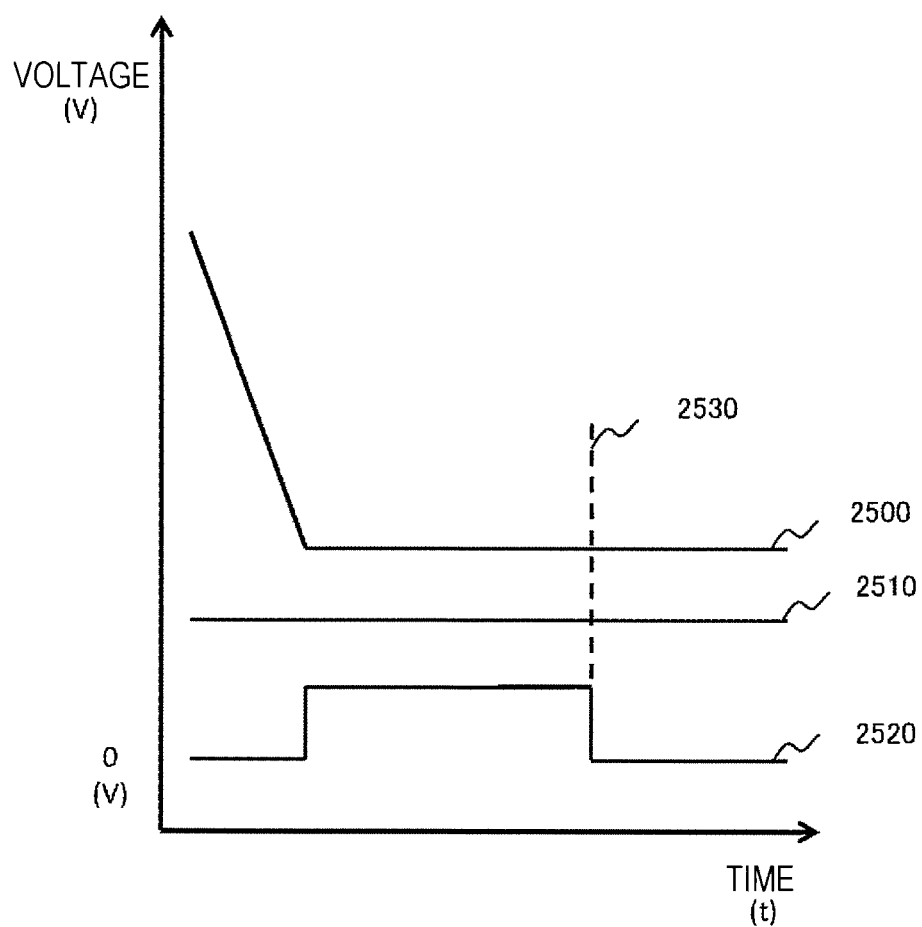
FIG. 25 is a diagram illustrating a relationship between a voltage observation pulse 2520 and a battery voltage waveform 2500 in a load-connected state.

FIG. 24 illustrates a voltage observation pulse and a battery voltage waveform in a no-load state.

Here, the vertical axis represents a voltage (V), and the horizontal axis represents time t. A reference numeral 2400 represents the battery voltage waveform in the no-load state, a reference numeral 2410 represents a first reference voltage that is output from the microcomputer 122, and a reference numeral 2420 represents a voltage observation pulse that is output from the microcomputer 122. So as to determine whether or not the battery voltage in the no-load state is equal to or greater than the first reference voltage, first, the microcomputer 122 outputs an off-signal to the signal line 385. As a result, the battery voltage 173 is separated from the load 381, and a battery voltage in the no-load state is input to an input terminal of the voltage detection circuit. Next, the microcomputer 122 outputs the first reference voltage to the analog signal line 386, and then turns on the voltage observation pulse signal line 389 and turns off the voltage observation pulse signal line 389 after a constant time. According to this operation, the flip-flop circuit 388 inputs an output signal 387 of the voltage detection circuit 385 at time at which the signal line 389 is turned on, and performs an operation of latching the signal line 387 at falling timing at which the signal line 389 is turned off. As a result, a latch result can be input to the microcomputer 122 through the signal line 390. The voltage detection circuit 386 outputs "1" to the signal line 387 when the battery voltage 173 is higher than the first reference voltage 386, and outputs "0" to the signal line 387 when the battery voltage is lower than the first reference voltage 2410. Accordingly, the microcomputer 122 can easily determine that the battery voltage is equal to or greater than the first reference voltage or equal to or less than the reference voltage by using the value "1" or "0" of the signal line 390. In FIG. 24, the latch timing is time indicated by a dotted line 2430. Since the battery voltage 2400 is higher than the first reference voltage 2410, "1" is output to the signal line 390.

Next, description will be given of a battery voltage waveform in a load-connected state with reference to FIG. 25.

Here, the vertical axis represents a voltage (V), and the horizontal axis represents time t. A reference numeral 2500 represents a battery voltage waveform in the load-connected state, a reference numeral 2510 represents a second reference voltage that is output from the microcomputer 122, and a reference numeral 2520 represents a voltage observation pulse that is output from the microcomputer 122. So as to determine whether or not the battery voltage in the load-connected state is equal to or greater than second reference voltage, first, the microcomputer 122 outputs an on-signal to the signal line 385. As a result, the battery voltage 173 is connected to the load 381 without being separated from each other, and thus a battery voltage in the load-connected state is input to the input terminal of the voltage detection circuit. Internal resistance is present in the battery, and thus the battery voltage does not reach 0 V as illustrated by the battery voltage 2500 in FIG. 25. Next, the microcomputer 122 outputs the second reference voltage to the analog signal line 386, and then turns on the voltage observation pulse signal line 389 and turns off the voltage observation pulse signal line 389 after a constant time. According to this operation, the flip-flop circuit 388 inputs an output signal 387 of the voltage detection circuit 385 at time at which the signal line 389 is turned on, and performs an operation of latching the signal line 387 at falling timing at which the signal line 389 is turned off. As a result, a latch result can be input to the microcomputer 122 through the signal line 390. The voltage detection circuit 386 outputs "1" to the signal line 387 when the battery voltage 173 is higher than the second reference voltage 386, and outputs "0" to the signal line 387 when the battery voltage is lower than the second reference voltage 2510. Accordingly, the microcomputer 122 can easily determine that the battery voltage is equal to or greater than the second reference voltage or equal to or less than the reference voltage by using the value "1" or "0" of the signal line 390. In FIG. 25, the latch timing is time indicated by a dotted line 2530. Since the battery voltage 2500 is higher than the second reference voltage 2510, "1" is output to the signal line 390.

Hereinbefore, the operation of the voltage check circuit has been described in detail.

Next, description will be given of a data configuration, a memory configuration, and the like of the relay device and the vehicle-mounted control device according to this example with reference to FIG. 4 to FIG. 8A.

Figure 4:
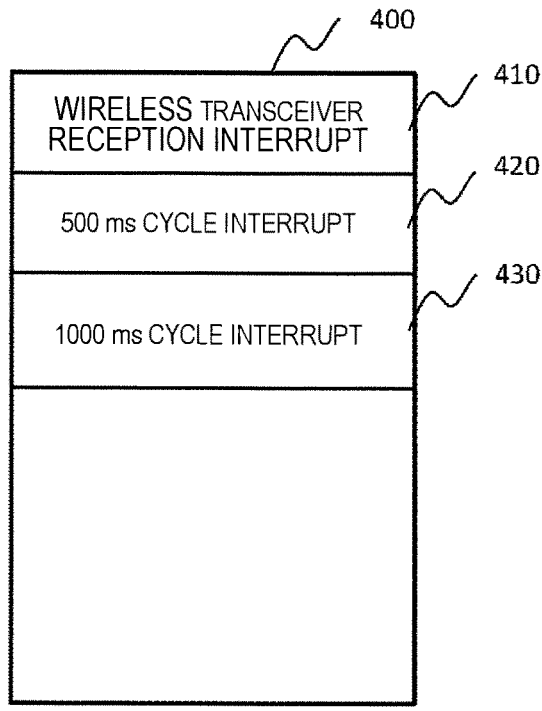
FIG. 4 is a configuration diagram of an interrupt table 400 of a relay device microcomputer.

FIG. 4 is an interrupt table configuration of the microcomputer of the relay device.

The interrupt table 400 is a table that branches an interrupt, which occurs on an outer side or an inner side of a microcomputer, to addresses registered in this table. Although details will be described later, an address 410 of a wireless transceiver reception interrupt program that is executed when update program data is received from a wireless transceiver, and an address 420 of a 500 ms cycle interrupt program configured to check whether or not the writing initiation command button is pressed are set in the relay device. In addition, examples of a case of the writing initiation command reception process program include a case where the program is activated by a command transmitted from the external center (the fourth aspect and the fifth aspect), and a case where the program is activated at a cycle of 1000 ms (the sixth case and the seventh case).

Figure 5:
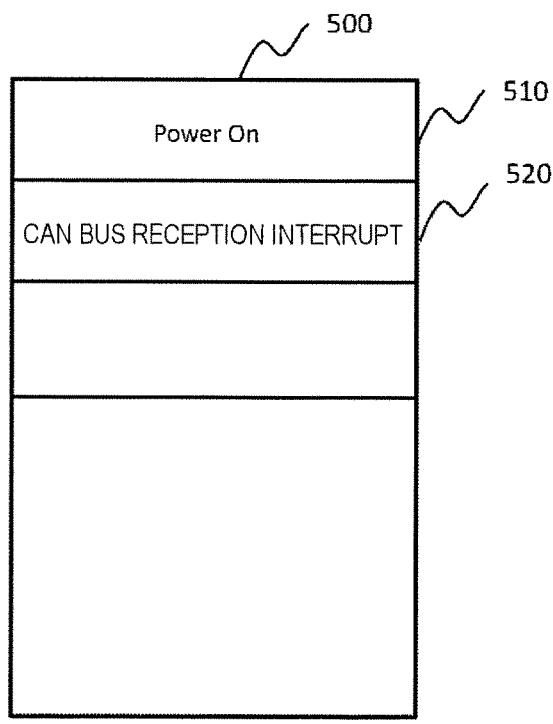
FIG. 5 is a configuration diagram of an interrupt table 500 of a vehicle-mounted control device microcomputer.

FIG. 5 illustrates an interrupt table configuration of a microcomputer of a vehicle-mounted control device. Interrupt tables of the vehicle-mounted control devices 130, 140, and 150 are the same as each other.

An interrupt table 500 is a table that branches an interrupt, which occurs on an outer side or an inner side of the microcomputer, to addresses registered in this table. As described above, in a case where the ignition IGN is turned on, or when receiving the wake up pattern from the vehicle-mounted network, the vehicle-mounted control device turns on the power of the microcomputer. An address of a program, which is executed when power is turned on, is registered in "510". An address of a program, which is executed when an update program and update data are received from the relay device, is registered in "520".

Figure 6:
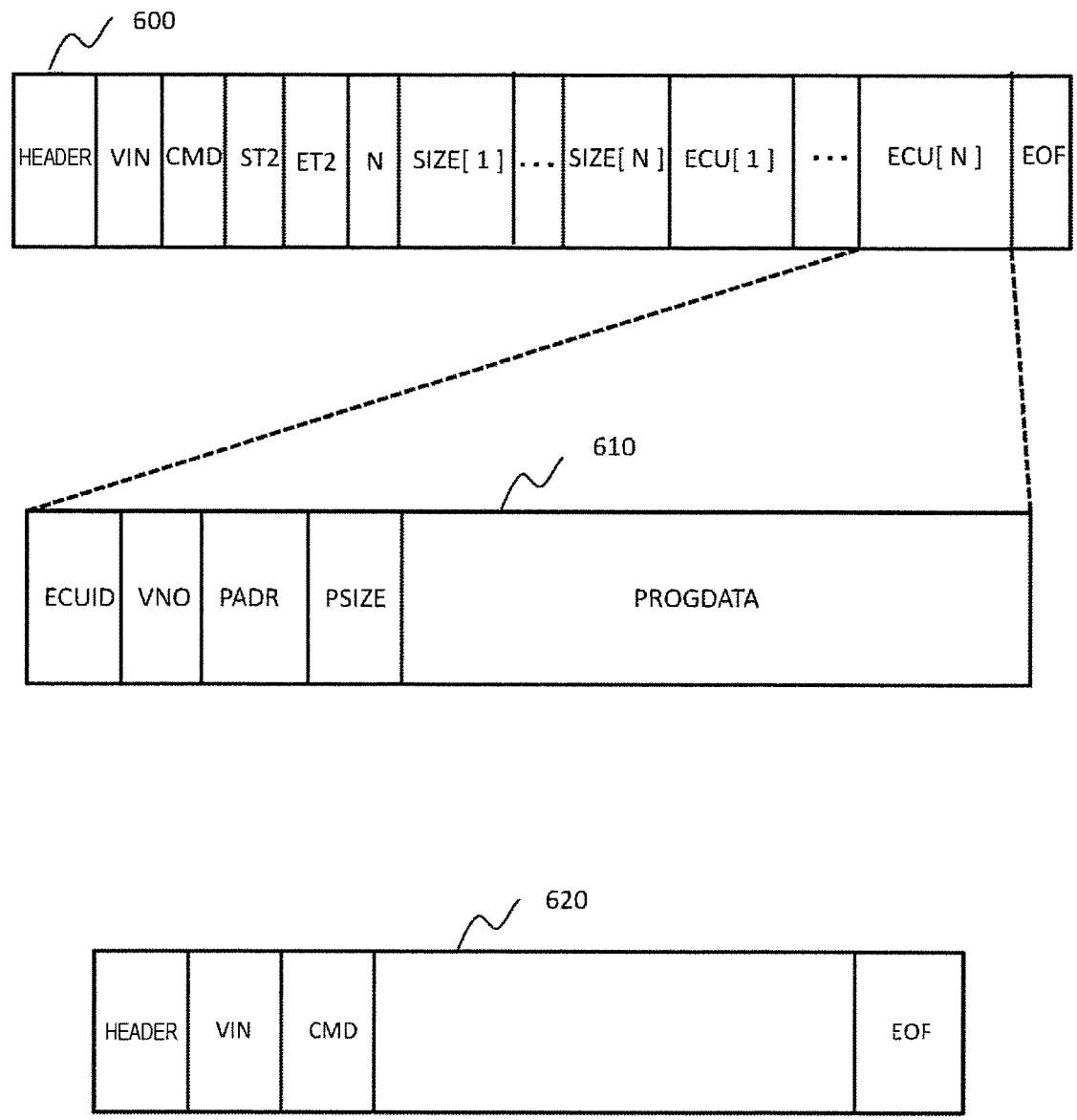
FIG. 6 is a configuration diagram of transmission data of an external center.

FIG. 6 illustrates a transmission data configuration of the external center. Description will be given of a configuration 600 of a plurality of pieces of update program data which are wirelessly transmitted from the external center 100, and a communication format of a writing initiation command configuration 620.

An initial header of the transmission data configuration 600 of the update program data represents information that instructs transmission initiation, and VIN represents a vehicle number that specifies a vehicle in a specific type. CMD represents a type of commands. When the CMD is "SNDPROG", this represents that received data is the update program data, and when the CMD is "WRITE", this represents that received data is a writing initiation command.

ST2 is start time in a second time zone in the invention, and ET2 represents end time of the second time zone. N represents the number of pieces of transmitted update program data. SIZE[1] represents a size of update program data that is transmitted for the first time, and is expressed by a byte unit. SIZE[N] represents a size of update program data that is finally transmitted.

ECU[1] represents information of update program data that is transmitted for the first time, and ECU[N] represents information of update program data that is finally transmitted. The number of pieces of the update program data information is the same as N. EOF represents information the last of the transmission data.

Next, description will be given of an internal data configuration 610 of the ECU[N]. The ECU[N] has the same internal data configuration as that of another ECU[1], and thus description will be collectively made with reference to the ECU[N]. In this example, the update program data of ECU[N] is constituted by update program, update data, and management information. First, ECUID represents a vehicle-mounted control device number that specifies a vehicle-mounted control device in a vehicle in a specific type. VNO represents aversion number of the update program and the update data, and PADR represents a write address of a ROM of the vehicle-mounted control device. The PADR is an initial address that is necessary when writing the update program and the update data in the ROM. PSIZE represents a size of the update program and the update data. A unit of the size is a byte. PROGDATA represents update program and an update data main body.

Next, description will be given of a transmission data configuration of the writing initiation instructing command of "620". VIN represents a vehicle number that specifies a vehicle in a specific type, and CMD represents a writing initiation instructing command.

Hereinbefore, description has been given of a wireless communication data configuration.

Figure 7:
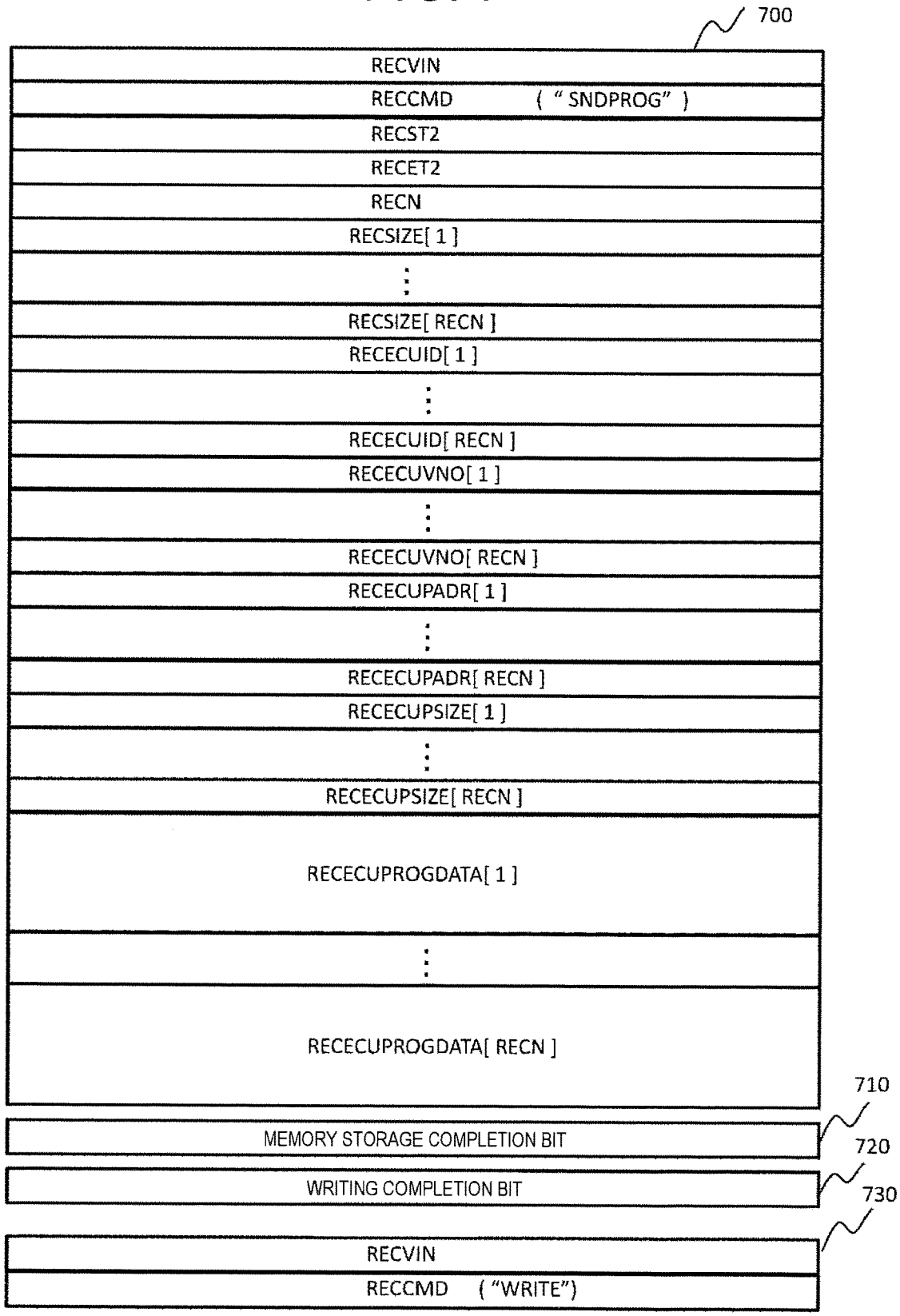
FIG. 7 is a configuration diagram of storage data of the relay device.

FIG. 7 illustrates a stored data configuration in the relay device. Description will be given of a data configuration in which update program data of wireless communication data, a writing initiation command, a memory storage completion bit that is used in an update process, and a writing completion bit are stored in the update data ROM 125. First, description will be given of a memory storage data configuration 700 of update program data. RECVIN represents a variable that holds received data VIN, RECCMD represents a variable of holding received data CMD, and is "SND-PROG" in a case where the update program data is received. RECST2 represents a variable that holds received data ST2, RECST2 represents a variable that holds received data ET2, RECN represents a variable that holds received data N, RECSIZE[1] to RECSIZE[RECN] represent a sequence of holding received data SIZE[1] to SIZE[N], RECECUID[1] to RECECUID[RECN] represent a sequence of holding received data ECUID [1] to ECUID[N], RECECUVNO[1] to RECECUVNO[RECN] represent a sequence of holding received data ECUVNO[1] to ECUVNO[N]. RECECUPADR[1] to RECECUPADR[RECN] represent a sequence of holding received data ECUPADR[1] to ECUPADR[N], RECECUPSIZE[1] to RECECUPSIZE[RECN] represent a sequence of holding received data ECUPSIZE[1] to ECUPSIZE[N], RECECUPROGDATA[1] to RECECUPROGDATA[REN] represent a sequence of holding received data ECUPROGDATA[1] to ECUPROGDATA[N].

A memory storage completion bit 710 represents a variable that is set to "on" after storage completion in a memory storage process.

A writing completion bit 720 represents a variable that is set in a case where writing of the entirety of update programs and update data in the vehicle-mounted control device is completed.

"730" represents storage data configuration of a writing initiation command. RECVIN and RECCMD "WRITE" represent variables which hold received data VIN and received data CMD "WRITE" in a case where the writing initiation command is received from the external center.

The above-described variables and sequences are stored in the update data ROM 125 in FIG. 1. Accordingly, these pieces of data are held without being erased even when the power of the microcomputer 122 is turned off.

Figure 8:
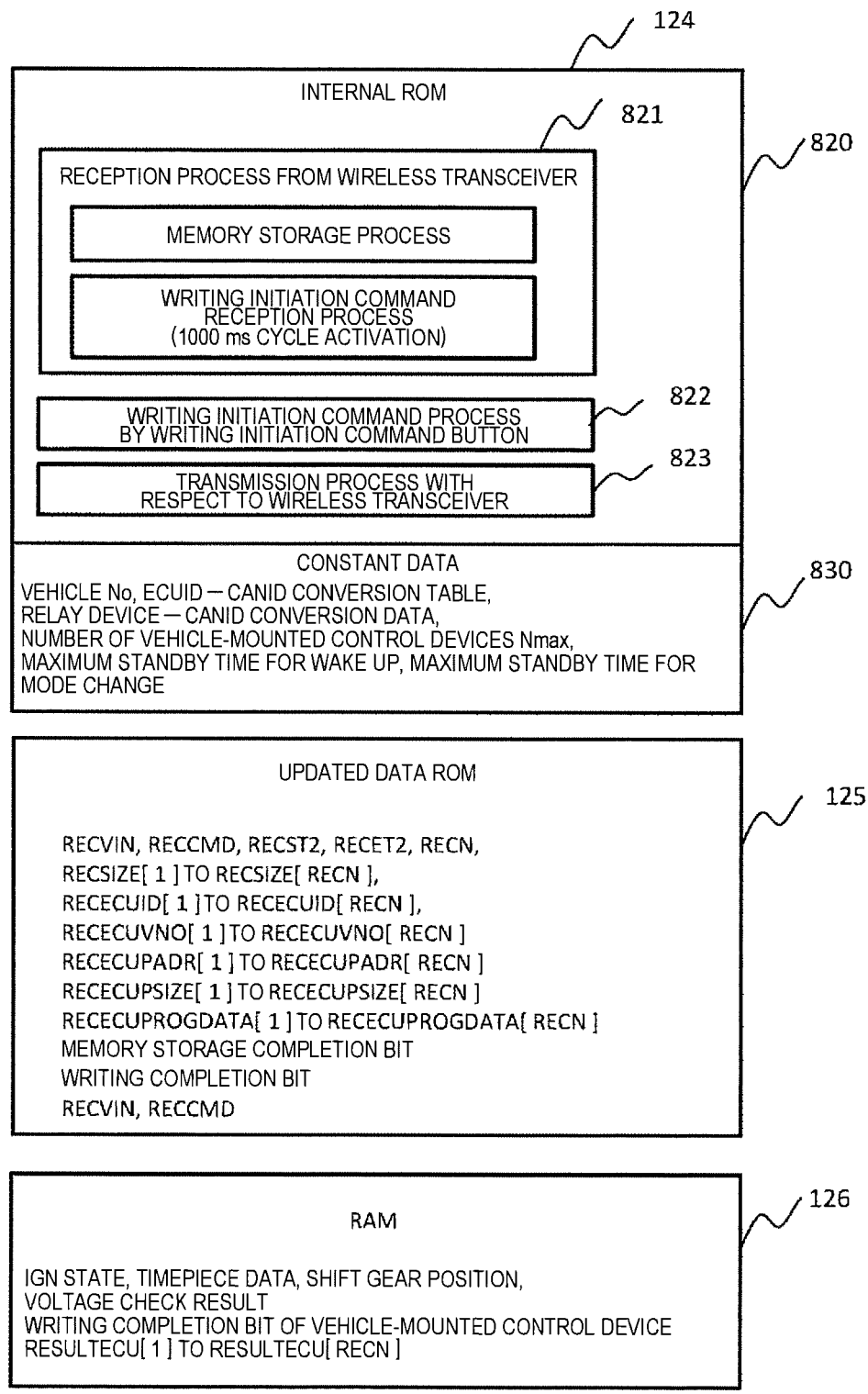
FIG. 8 is a configuration diagram of a memory of the relay device.

Description will be given of a memory configuration of the relay device in FIG. 8. In the internal ROM 124, a memory storage process program and a writing initiation reception process program, which is intercepted or is activated at a cycle of 1000 ms, is stored in a reception process program 821, which is activated through the intercept 410 from the wireless transceiver 121, from a wireless transceiver. In addition, a writing initiation command process program 822 by using the writing initiation command button, and a transmission process program 823 with respect to the wireless transceiver are also stored in the internal ROM 124. In addition, a vehicle number that can specifically designate the vehicle in a specific type, or a conversion table of ECUID that can specifically designate a vehicle-mounted control device mounted in the vehicle in a specific type and CANID is stored in a constant data area 830. In this example, in a case where an update program of a vehicle-mounted control device is transmitted to a vehicle-mounted control device that is specified for a vehicle-mounted network CAN, specific CANID is designated and then the update program is transmitted. That is, the vehicle-mounted control device can receive transmission data to which specific CANID is designated.

As described above, different CANID is allocated to each vehicle-mounted control device, and thus a communication is established between the relay device and the vehicle-mounted control device. Accordingly, the conversion table of ECUID for specifying the vehicle-mounted control device in a specific type and CANID is stored in the constant data area 830. Similarly, dedicated CANID is also allocated to the relay device, and in a case where the vehicle-mounted control device transmits transmission data to the relay device, the transmission data may be transmitted after designating CANID dedicated to the relay device. In addition, the number Nmax of the vehicle-mounted control devices which are mounted in the vehicle, or maximum standby time for wake up, and maximum standby time for mode change are also stored in the constant data area 830. The maximum standby time for wake up represents maximum time indicating that the entirety of the vehicle-mounted control devices are activated and a response can be transmitted to the vehicle-mounted network when waiting for how much time during activation of the vehicle-mounted control devices by the relay device in a state in which the ignition is in an off-state. Accordingly, after transmitting a wake up pattern to the vehicle-mounted network, the relay device can confirm responses from the entirety of the vehicle-mounted control devices when confirming a reception buffer after elapse of the maximum standby time for wake up. Wake up activates the entirety of the vehicle-mounted control devices instead of activation of a specific vehicle-mounted control device. Similarly, the maximum standby time for mode change represents maximum time indicating that a mode change completion reply is returned to a designated vehicle-mounted network when waiting for how much time in a case where the relay device transmits a mode change to, for example, a repro mode to the vehicle-mounted network. In mode change transmission, CANID is designated, and thus a mode of only a specific vehicle-mounted control device is changed. The update data ROM 125 is a flash memory that stores data received from the external center. The storage data 700 in FIG. 7 is stored in the update data ROM 125. The RAM 126 is a work area that is used by a program of the internal ROM 820. Data such as an IGN state, timepiece data, and a shift gear position is read out from the RAM 126, and the RAM 126 is constituted by an SRAM. In addition, the voltage check result, the ignition state, the timepiece data, and the writing completion bits RESULTECU[1] to RESULTECU[REC] of the vehicle-mounted control device are stored in the RAM 126 during execution of the program.

FIG. 8A illustrates a memory configuration of a vehicle-mounted control device. In this example, memory configurations of all vehicle-mounted control devices are the same as each other except for a shift gear position, and thus description will be made with reference to the drawing. In the ROM 133, a wake up reception process program 8A04 that receives an update program and update data, a repro mode reception process program 8A05 that receives a repro mode command, and a writing process program 8A06 that writes the update program and the update data in an area of 8A03 are stored in a program area 8A01 of the ROM 133. Own ECUID that specifies the vehicle-mounted control device itself in a specific type, conversion data of ECUID and CANID that forms a counterpart of ECUID, conversion data of relay device ECUID that is used during transmission to the relay device and CANID, maximum standby time for wake up, and maximum standby time for mode change are stored in a constant data area 8A02. 8A04 is a "vehicle-mounted control device mode" variable that represents an operation mode of the vehicle-mounted control device. Examples of the operation mode include two kinds of modes such as a typical operation mode in which a control operation is executed, and a "repro mode" in which a program update process is executed. The operation mode transitions to a mode in accordance with a set value with reference to the "vehicle-mounted control device mode" variable during activation by power-on or wake up. In addition, the transition occurs when a request for transition to "repro mode" is made during the "typical operation mode". In addition, the opposite transition is also possible. The RAM 134 is a work area in which an ignition state is stored and which is used during execution of the programs 8A04, 8A05, and 8A06. However, only the vehicle-mounted control device 140 holds a shift gear position.

Figure 9:
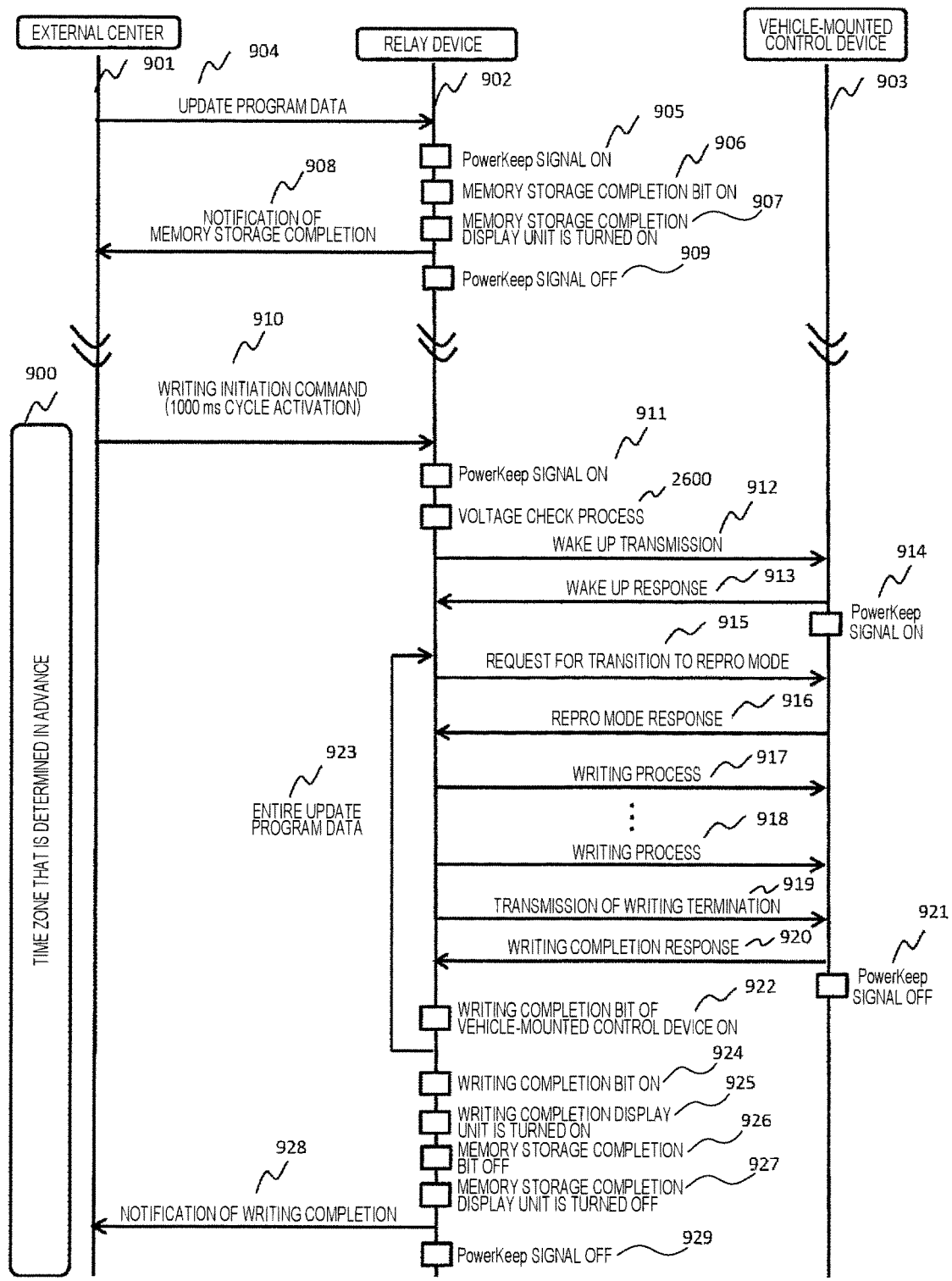
FIG. 9 is a schematic diagram illustrating a writing process by a writing initiation command from the external center.
Figure 10:
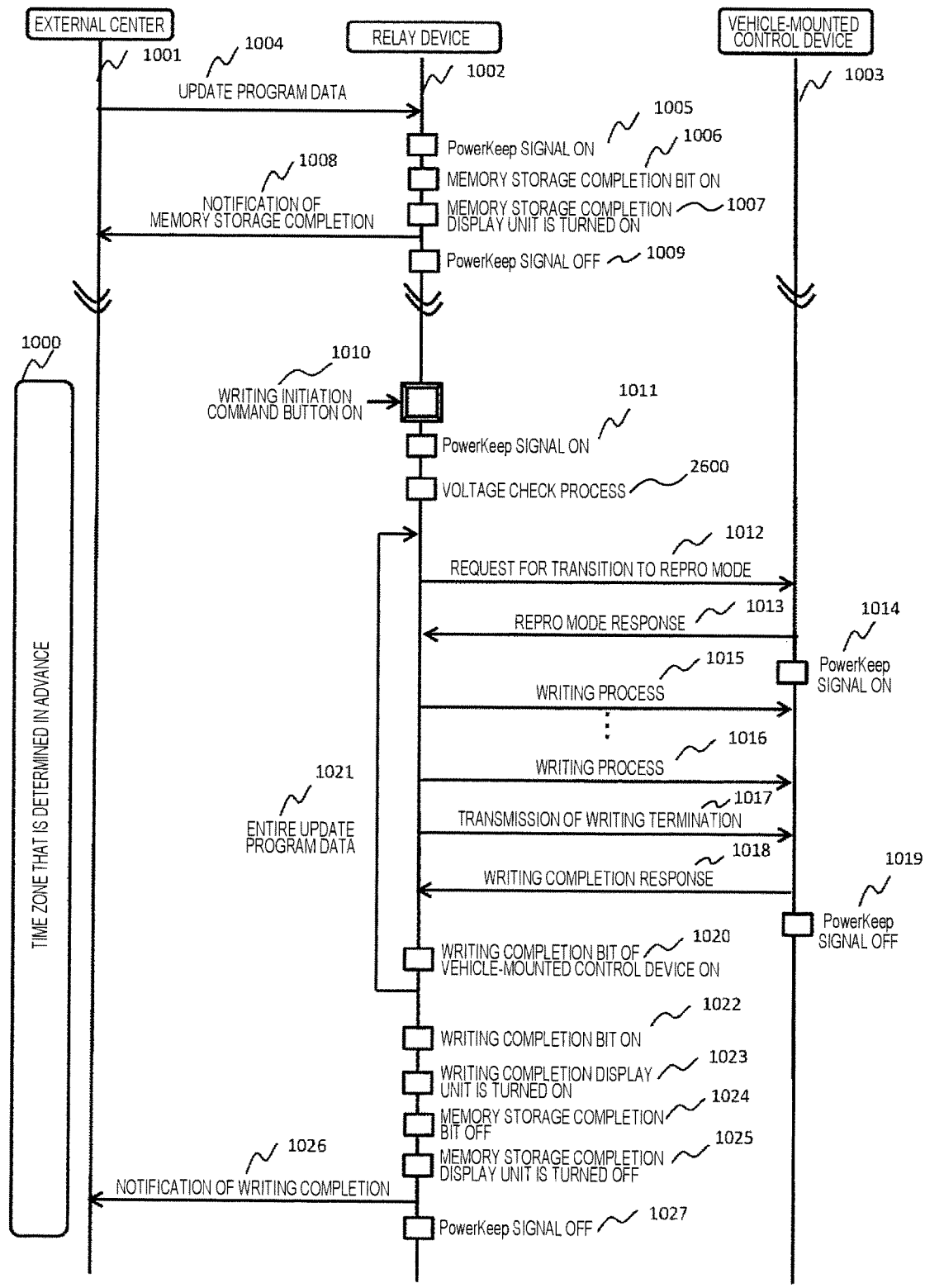
FIG. 10 is a schematic diagram illustrating a writing process by a writing button.

Process overviews of the fourth to seventh aspects of the invention are illustrated in FIG. 9, and process overviews of the tenth to thirteenth aspects of the invention are illustrated in FIG. 10 with reference to the above-described configurations. The first to third, and eighth to ninth aspects will be described in detail during description of the above-described aspects.

First, consideration will be given of a history from a point of time at which program update is found to time at which an update process is executed. When a vehicle maker founds a bug or an improvement in a vehicle-mounted control program, an update program and update data are created. Next, a vehicle owner is notified of explanation of contents for failure and an improvement thereof with a document through a shop and the like. Then, so as to take a measure, the shop confirms approval for program update with respect to the vehicle owner through a telephone and the like, and explains that driving of a vehicle is not possible in a time zone in which writing of the update program is being executed. After obtaining agreement, the shop notifies the external center of a date time zone which is promised to the vehicle owner and is appropriate for execution of the vehicle program update. As described above, it is important to update perform program update at a time zone appropriate for the vehicle owner in order for the vehicle owner not to feel inconvenient.

So as to write update program data in the vehicle of the owner at the notified time zone, it is required for the external center to transmit update program data to the relay device of the vehicle of the owner before the notified time zone, and to store the update program data in the vehicle. The above-described history relates to the fourth to seventh aspects, and is realized by a process flow of the invention illustrated in FIG. 9.

On the other hand, when the update program, data is stored in the vehicle-mounted relay device, the following case can be considered. Specifically, program update is executed at timing convenient for a driver without waiting for a writing initiation command from the external center. This case corresponds to the tenth to thirteenth aspects, and is realized by a process flow in FIG. 10. However, it cannot be said that the driver is the vehicle owner. Accordingly, in a case where the owner designates the time zone, it is necessary to prohibit writing in a range out of the time zone. An aspect for realization of the prohibition process corresponds to cases of the twelfth and thirteenth aspects. Hereinafter, an overview except for details will be described with reference to FIG. 9 and FIG. 10.

FIG. 9 illustrates a process overview of a writing process by a writing initiation command from the external center.

Process overviews in the external center, the relay device, and the vehicle-mounted control device will be described along respective time axes 901, 902, and 903.

First, the external center transmits update program data 904 to the relay device at time before a time zone that is promised to the vehicle owner in advance. When the ignition is in an on-state, the relay device performs reception. First, the relay device turns on a PowerKeep signal (905) so as to secure power of the relay device, and stores the update program data in the update data ROM. Next, the relay device turns on a memory storage completion bit (906), and turns on a memory storage completion display unit (907). Next, the external device is notified of memory storage completion (908), and the PowerKeep signal is turned off (909). After completion of the above-described process, in the fourth and fifth aspects, the external device transmits a writing initiation command 910 to the relay device at a first time zone that is determined in advance. In addition, in the sixth and seventh aspects, in a case where it is determined that current time is in a second time zone that is already received, the relay device turns on the PowerKeep signal (911), performs a voltage check process 2600 in a no-load state and in a load-connected state, and when the voltage is equal to or greater than a reference voltage, the relay device transmits a wake up pattern to the vehicle-mounted control device (912). When receiving the wake up pattern, the power of the vehicle-mounted control device is turned on, and thus the vehicle-mounted control devices executes a program and turns on the PowerKeep signal (914). After receiving a wake up response 913 from the vehicle-mounted control device, the relay device transmits a repro mode transition request 915 to a vehicle-mounted control device that makes a request for program update. After confirming returning of a repro mode response 916 from the vehicle-mounted control device, the relay device repetitively transmits a writing process 917 and a writing process 918 in a state in which the update program and the update data are divided from each other. After transmitting the entirety of update programs and update data of the vehicle-mounted control device, the relay device transmits writing termination (919). When receiving writing termination, the vehicle-mounted control device transmits a writing completion response 920 to the relay device and turns off the PowerKeep signal (921). When the writing completion response 920 is returned from the vehicle-mounted control device, the relay device turns on a writing completion bit of the vehicle-mounted control device (922) because the update program and update data processing of the vehicle-mounted control device is completed. In a case where update program data of another vehicle-mounted control device is present, the relay device repeats a process of transmitting the entirety of update programs and update data to the vehicle-mounted control device (923). Then, if writing is successful (OK) in the entirety of vehicle-mounted control devices, the relay device turns on the writing completion bit (924), turns on the writing completion display unit (925), turns off the memory storage completion bit (926), turns off the memory storage completion display unit (927), notifies the external center of writing completion (928), and turns off the PowerKeep signal (929) to terminate the above-described process. This process is an overview, and in a case where the vehicle-mounted control device is out of control, the writing fails. Accordingly, it is necessary to notify the external center of the failure in writing, but this will be described later in a detailed process flow.

Next, description will be given of process overviews in the tenth to thirteenth aspects of the invention with reference to an overview of a writing process by the writing button in FIG. 10.

FIG. 10 illustrates process overviews in the external center, the relay device, and the vehicle-mounted control device. Description will be given along time axes 1001, 1002, and 1003 of the external center, the relay device, and the vehicle-mounted control device.

First, in a case where a time zone promised to the vehicle owner is determined in advance, the external center transmits update program data 1004 to the relay device at time before the time zone. When the ignition is in an on-state, the relay device performs reception. First, the relay device turns on a PowerKeep signal (1005) so as to secure power of the relay device, and stores the update program data in the update data ROM. Next, the relay device turns on a memory storage completion bit (1006), and turns on a memory storage completion display unit (1007). Next, the external device is notified of memory storage completion (1008), and the PowerKeep signal is turned off (1009). The above-described process is the same as in FIG. 9, but the subsequent process is different from FIG. 9. First, after confirming that the memory storage completion display unit is turned on, the driver presses the writing initiation command button that is connected to the relay device. Even when pressing the writing initiation command button in a state in which the memory storage completion display unit is turned off, writing is not executed. Next, after confirming the writing initiation command button is pressed, the relay device turns on the PowerKeep signal (1011) so as to secure the power of the relay device itself. Next, the relay device performs a voltage check process 2600 in a no-load state and a load-connected state. In a case where a battery voltage is equal to or greater than a reference voltage, the relay device transmits a request for transition to a repro mode 1012 to a vehicle-mounted control device that makes a request for program update. After transition to the repro mode, the vehicle-mounted control device transmits a repro mode response 1013 to the relay device, and turns on the PowerKeep signal (1014). After confirming returning of the repro mode response 1013 from the vehicle-mounted control device, the relay device repetitively transmits writing processes 1015 and 1016 in a state in which the update program and the update data are divided from each other. After transmitting the entirety of update programs and update data of the vehicle-mounted control device, the relay device transmits a writing termination notification (1017). When receiving the writing termination notification 1017, the vehicle-mounted control device changes the repro mode to the typical operation mode, transmits a writing completion response 1018 to the relay device, and turns off the PowerKeep signal (1019). The writing completion response 1018 is returned from the vehicle-mounted control device, the relay device turns on the writing completion bit of the vehicle-mounted control device (1020) because the update program and update data processing of the vehicle-mounted control device is completed. In a case where update program data of another vehicle-mounted control device is present, the relay device repeats a process of transmitting the entirety of update programs and update data to the vehicle-mounted control device (1021). Then, if writing is successful (OK) in the entirety of vehicle-mounted control devices, the relay device turns on the writing completion bit (1022), turns on the writing completion display unit (1023), turns off the memory storage completion bit (1024), turns off the memory storage completion display unit (1025), notifies the external center of writing completion (1026), and turns off the PowerKeep signal (1027) to terminate the above-described process. This process is an overview, and in a case where the vehicle-mounted control device is out of control, the writing is failed. Accordingly, it is necessary to notify the external center of the failure in writing, but this will be described later in a detailed process flow.

Figure 11:
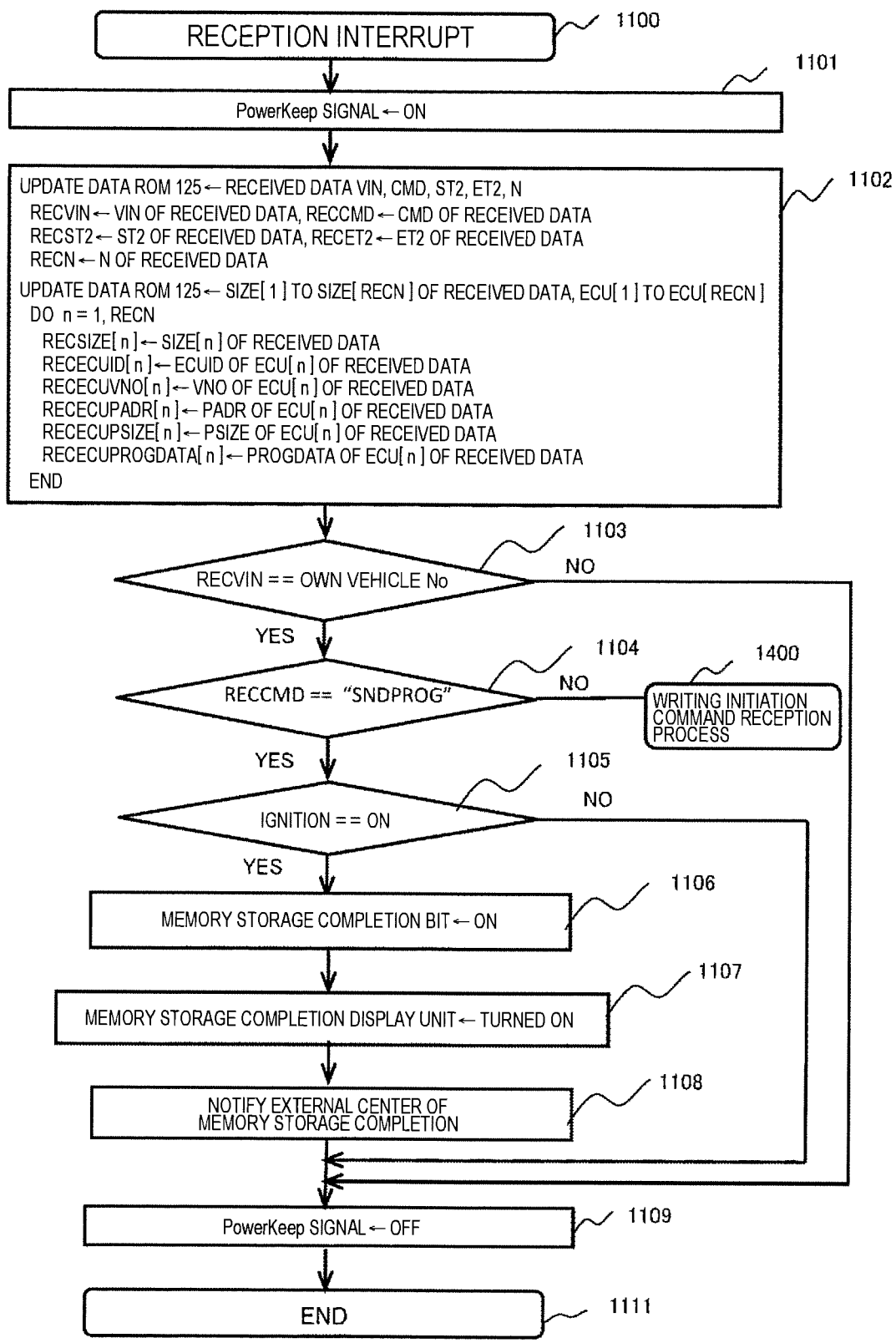
FIG. 11 is a diagram illustrating a memory storage process in the relay device.

FIG. 11 illustrates a memory storage process in the relay device. The process is common to the processes in FIG. 9 and FIG. 10. First, when a reception interrupt 1100 from the wireless transceiver is input to the microcomputer, this program is activated. First, a PowerKeep signal of the relay device is turned on (1101), and then a process of storing received data in the update data ROM (1102) is executed. Process contents are to convert data 600 in FIG. 6 into storage data 700 in FIG. 7 and stores the storage data 700 in the update data ROM. Details are as follows.

VIN of own vehicle number of received data is written in a variable RECVIN of the update data ROM.

CMD of a command of received data is written in a variable RECCMD of the update data ROM.

Initiation time ST2 in the second time zone of received data is written in a variable RECST2 of the update data ROM.

Termination time ET2 in the second time zone of received data is written in a variable RECST2 of the update data ROM.

The number N of update program data of received data is written in a variable RECN of the update data ROM.

Respective received data sizes SIZE[1] to SIZE[RECN] of received data are written in sequences RECSIZE[1] to RECSIZE[RECN] of the update data ROM.

Vehicle-mounted control device numbers ECUID[1] to ECUID[RECN] of received data are written in sequences RECECUID[1] to RECECUID[RECN] of the update data ROM.

Versions VNO[1] to VNO[RECN] of an update program and update data of received data are written in sequences RECECUVNO[1] to RECECUVNO[RECN] of the update data ROM.

Writing initial addresses PADR[1] to PADR[RECN] of the update program and the update data of received data are written in sequences RECECUPADR[1] to RECECUPADR[RECN] of the update data ROM.

Sizes PSIZE[1] to PSIZE[RECN] of the update program and the update data of received data are written in sequences RECECUPSIZE[1] to RECECUPSIZE[RECN] of the update data ROM.

Main bodies of the update program and the update data PROGDATA[1] to PROGDATA[RECN] of received data are written in sequences RECECUPROGDATA[1] to RECECUPROGDATA[RECN] of the update data ROM.

Here, a thing that needs to be paid special attention is as follows. A vehicle-mounted control device number to be updated is stored in RECECUID[n] (n is 1 to RECN), and the initial address, at which the update program and the update data are written in the ROM of the vehicle-mounted control device, is stored in RECECUPADR[n] (n is 1 to RECN).

Next, so as to determine whether or not received data is transmission data with respect to own vehicle in step 1103, a check is made on whether or not RECVIN and a vehicle number that is stored in the constant data area of the internal ROM 124 match each other. If matching is not established, a PowerKeep signal is turned off in step 1109, and the process is terminated. If matching is established, a check is made on whether or not RECCMD is "SNDPROG" in step 1104 because the received data is received data with respect to the vehicle. If matching is not established, a writing initiation command process 1400 is executed because the received data is another command. If matching is established, a check is made on whether the ignition of the vehicle is in an on-state in step 1105 because the received data is the update program data. If matching is not established, the PowerKeep signal is turned off in step 1109 to wait for the subsequent transmission from the external center, and the process is terminated. When matching is established, the memory storage completion bit is turned on in step 1106, the memory storage completion display unit is turned on in step 1107, the external center is notified of the memory storage completion in step 1108, and the PowerKeep signal is turned off in step 1109 to terminate the process. Here, the notification of the memory storage completion with respect to the external center is performed by delivering notification data to the transmission process program 823 with respect to the wireless transceiver.

Hereinbefore, description has been given of details of the memory storage completion process according to the fourth to thirteenth aspects.

Next, description will be given of a transmission data configuration of the writing initiation instructing command that is transmitted from the external center at a time zone that is determined in advance with reference to the configuration 620 in FIG. 6. An initial header of the configuration 620 represents information that indicates initiation of transmission, and VIN is a vehicle number that specifies a vehicle in a specific type. CMD represents a writing initiation instructing command. EOF represents information that indicates termination of transmission. Here, if CMD is "SNDPROG", received data represents update program data, and CMD is "WRITE", the received data represents a writing initiation command. Here, since the received data represents the writing initiation command, CMD becomes a "WRITE" command. As described above, data subsequent to the CMD is greatly different between the "SNDPROG" command and the "WRITE" command.

Figure 12:
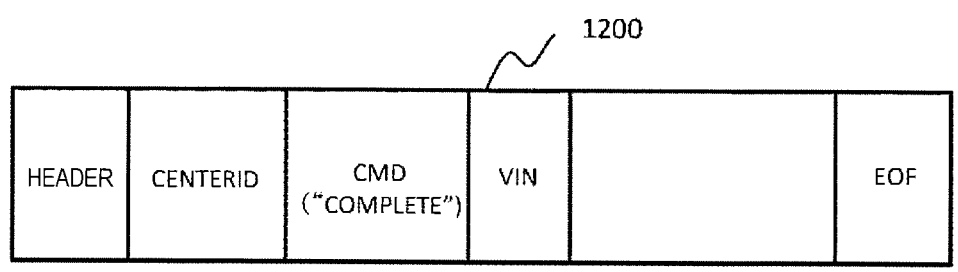
FIG. 12 is a configuration diagram of writing completion notification transmission data to the external center.

Next, description will be given of a transmission data configuration of a writing completion notification that is transmitted to the external center by the relay device after completion of writing with reference to FIG. 12. In "1200", CENTERID is an external center number that specifies the external center in a specific type, and CMD is a command that represents completion or incompletion of writing. "COMPLETE" represents completion of writing, and "INCOMPLETE" represents incompletion of writing. VIN represents a vehicle number that specifies a vehicle in a specific type.

Figure 13:
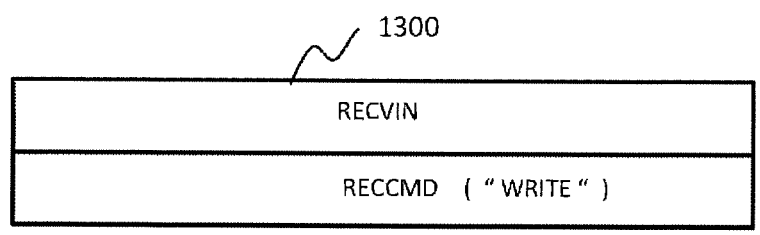
FIG. 13 is a configuration diagram of storage data of the writing initiation command from the relay device.

FIG. 13 illustrates a storage data configuration 1300 of the writing initiation command from the relay device. FIG. 13 illustrates the same configuration as the configuration 730 in FIG. 7. RECVIN and RECCMD except for the header and EOF are held in the update data ROM. FIG. 13 is necessary for realization of the fourth and fifth aspects, but is not necessary in the sixth and seventh aspect. The reason for this is because the second time zone is already received during reception of the update program data.

Next, a writing process in a case of receiving the writing initiation command from the external center will be described in detail with reference to FIG. 14 to FIG. 21. This case corresponds to an example of the fourth to seventh aspects, but also includes an example of the first to third aspects of the invention. The writing initiation command is initiated by branching to the writing initiation command reception process 1400 in FIG. 11, or activation at a cycle of 1000 ms. Details of the writing initiation command reception process will be described with reference to FIG. 14. First, the PowerKeep signal is set to ON so as to define the power of the relay device in step 1401. Next, a check is made on whether or not RECCMD and "WRITE" match each other in step 1402, and if matching is not established, the PowerKeep signal is turned off in step 1407 to terminate the process. If matching is established, it can be said that RECCMD is a writing initiation instructing command, and thus a check is made on whether or not the memory storage completion bit is turned on in step 1403. If the memory storage completion bit is not turned on, the PowerKeep signal is turned off in step 1407 to terminate the process. If matching is established, a check is made on whether or not the ignition is turned off in step 1404. If the ignition is not turned off, the PowerKeep signal is turned off in step 1407 to terminate the process. If matching is established, current time of the timepiece is set to a variable T in step 1405, and determination is made on whether or not a relationship of RECST2<T<RECET2 is established in step 1406. If the relationship is not established (NO in step 1406), it can be said that a time zone is not the time zone that is determined in advance, the PowerKeep signal is turned off in step 1407 to terminate the process. If the relationship is established (YES in step 1406), a voltage check process 2600 in a no-load state and a load-connected state is executed. A result thereof is stored in a variable RESULTVOL, and thus a check is made on whether or not the variable RESULTVOL is "OK" in step 1406A. If the check result is NO, the PowerKeep signal is turned off in step 1407 to terminate the process. If the check result is YES, it can be said that the battery voltage is equal to or greater than a reference voltage, a writing initiation process 1500 is executed. Finally, after the writing initiation process is terminated, the PowerKeep signal is turned off in step 1407 to terminate the process. As described above, it can be seen that in a case where the memory storage completion bit is turned on, the ignition is turned off, the voltage check result in the no-load state and the load-connected state is equal to or greater than the reference voltage, and the writing indication command is received in a range of the time zone that is determined in advance, the writing is initiated, and writing is not initiated in the other cases.

The above-described process flow corresponds to an example of the seventh aspect, but step 1404, step 1405, and step 1406 may be omitted in an example of the fourth aspect. An example of the fifth aspect corresponds to a process flow in which step 1405 and step 1406 are omitted, and an example of the sixth aspect corresponds to a process flow in which step 1404 is omitted.

Next, details of the writing initiation process 1500 will be described with reference to FIG. 15.

First, the relay device transmits a wake up pattern to a CAN bus of a vehicle-mounted network in step 1501 to activate the entirety of vehicle-mounted control devices. Next, the relay device sets a constant maximum standby time for wake up to a variable WKMAXTIME in step 1502, and makes a determination on whether or not a relationship of WKMAXTIME>elapsed time is established in step 1503. The determination is made to wait for constant time until the power of the vehicle-mounted control device, which receives the wake up pattern, is turned on for activation. If the result is YES in step 1503, it can be said that time is within the maximum standby time, and a vehicle-mounted control device, which is not activated yet, may exit. Accordingly, a process in step 1504 is executed after waiting until the result becomes NO. That is, the process in step 1504 is executed in a state in which the entirety of vehicle-mounted control devices are activated. Although in the middle of the process in FIG. 15, an operation of a vehicle-mounted control device, which receives the wake up pattern, will be described with reference to a wake up reception process in the vehicle-mounted control device in FIG. 16. First, when the wake up pattern is received, as described above, the power of the entirety of vehicle-mounted control devices is turned on in step 1600. Next, the PowerKeep signal is turned on in step 1601, and confirmation of wake up reception from the CAN bus is confirmed by a WakeUp signal in step 1602. Next, in step 1603, CANID dedicated to the relay device is set to a CANID field of a transmission butter, "WAKEUP RESPONSE" is set to a CMD field of the transmission buffer, and own vehicle-mounted control device ECUID is set to a DATA field of the transmission buffer. Next, the contents of the transmission buffer are transmitted to the CAN bus in step 1604, and the process is terminated. As described above, the vehicle-mounted control devices notify the relay device of completion of own activation through the CAN bus. Next, description will be given by returning to step 1504 in FIG. 15. That is, the vehicle-mounted control devices are required to be set to the repro mode after the entirety of vehicle-mounted control devices are activated. Accordingly, first, a process of performing writing after setting a vehicle-mounted control device of RECECUID[1] to the repro mode is executed. First, "1" is set to a variable n in step 1504. In step 1505, CANID dedicated to RECECUID[n] is set to the CANID field of the transmission buffer, "REPRO_MODE" representing a repro mode command is set to the CMD field of the transmission buffer, ECUID dedicated to the relay device is set to the DATA field of the transmission butter, and the transmission buffer is transmitted to the CAN bus. Next, in step 1506, the maximum standby time for mode change is set to a variable REPROMAXTIME. In step 1507, waits until elapsed time exceeds the maximum time so as to wait for a response from the vehicle-mounted control device No. RECECUID[n]. In a case where the elapsed time exceeds the maximum time (NO in step 1507), a process of investigating data received from RECECU[n] in step 1508. Here, although in the middle of description of the process in FIG. 15, description will be given of an operation of a vehicle-mounted control device of a vehicle-mounted control device No. RECECUID[n] which receives the repro mode with reference to a repro mode reception process in RECECUID[n] in FIG. 17.

Figure 17:
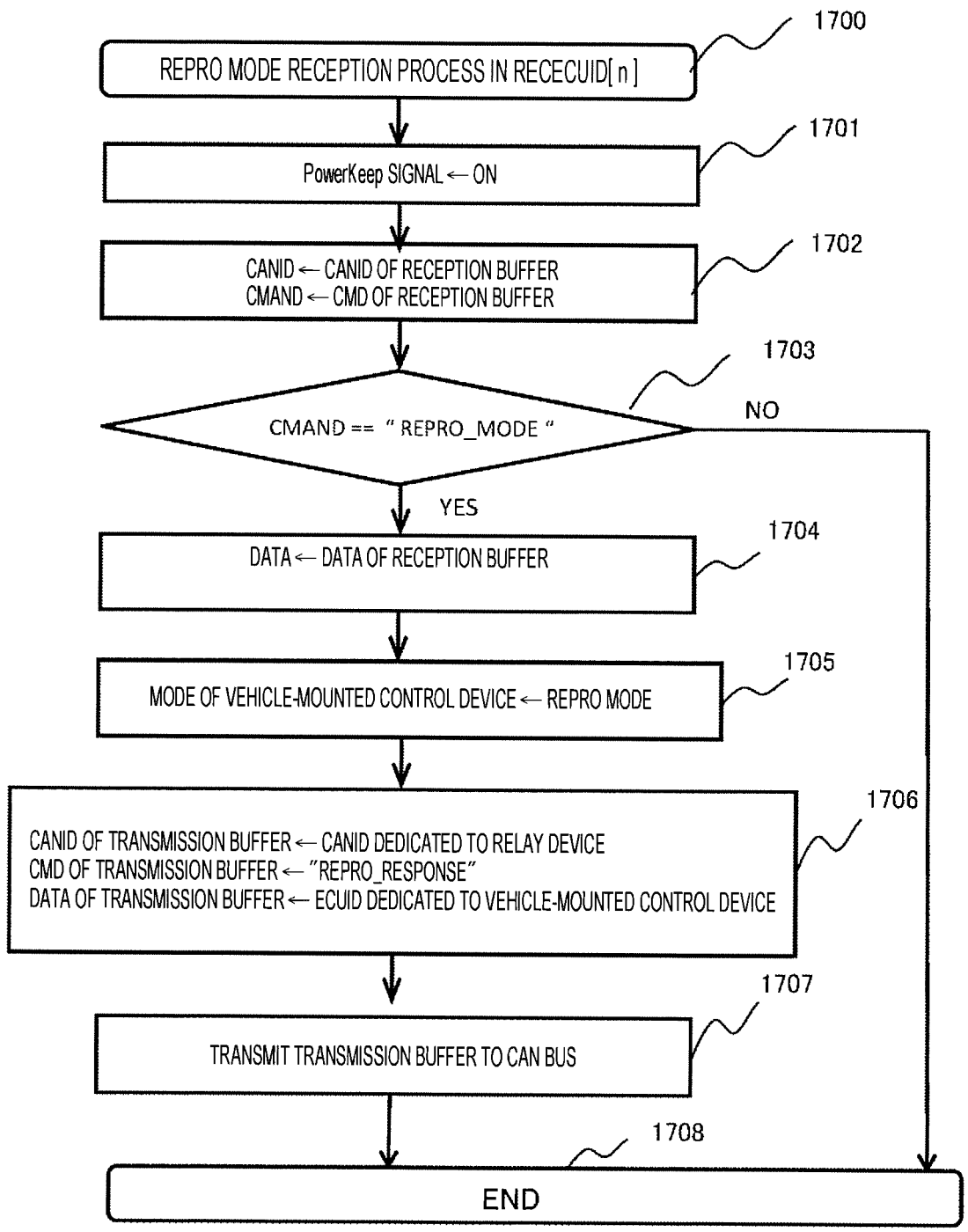
FIG. 17 is a diagram illustrating a repro mode reception process in the vehicle-mounted control device indicated by vehicle-mounted control device No. RECECUID[n].

FIG. 17 illustrates the repro mode reception process in RECECUID[n]. The PowerKeep signal is turned on in step 1701. Since the PowerKeep signal is turned on already during wake up, there is no effect, but even though the PowerKeep signal is turned on several times, this operation does not have any effect on the turning-on of the PowerKeep signal. Next, in step 1702, data of a CANID field of the reception buffer is set to a variable CANID, and data of a CMD field of the reception buffer is set to a variable CMAND. Next, in step 1703, determination is made on whether or not the variable CMAND is "REPRO_MODE". In a case where a determination result is NO, the process is terminated, and in a case where the determination result is YES, data of a DATA field of the reception buffer is set to a variable DATA in step 1704. Next, in step 1705, the vehicle-mounted control device is set to the repro mode to notify the relay device of setting to the repro mode. In step 1706, CANID dedicated to the relay device is set to the CANID field of the transmission buffer, "REPRO_RESPONSE" indicating that the repro mode setting is completed is set to the CMD field of the transmission buffer, and own ECUID of the vehicle-mounted control device is set to the DATA field of the transmission buffer. Next, in step 1707, the transmission buffer is transmitted to the CAN bus to notify the relay device of completion of the repro mode setting.

Figure 15:
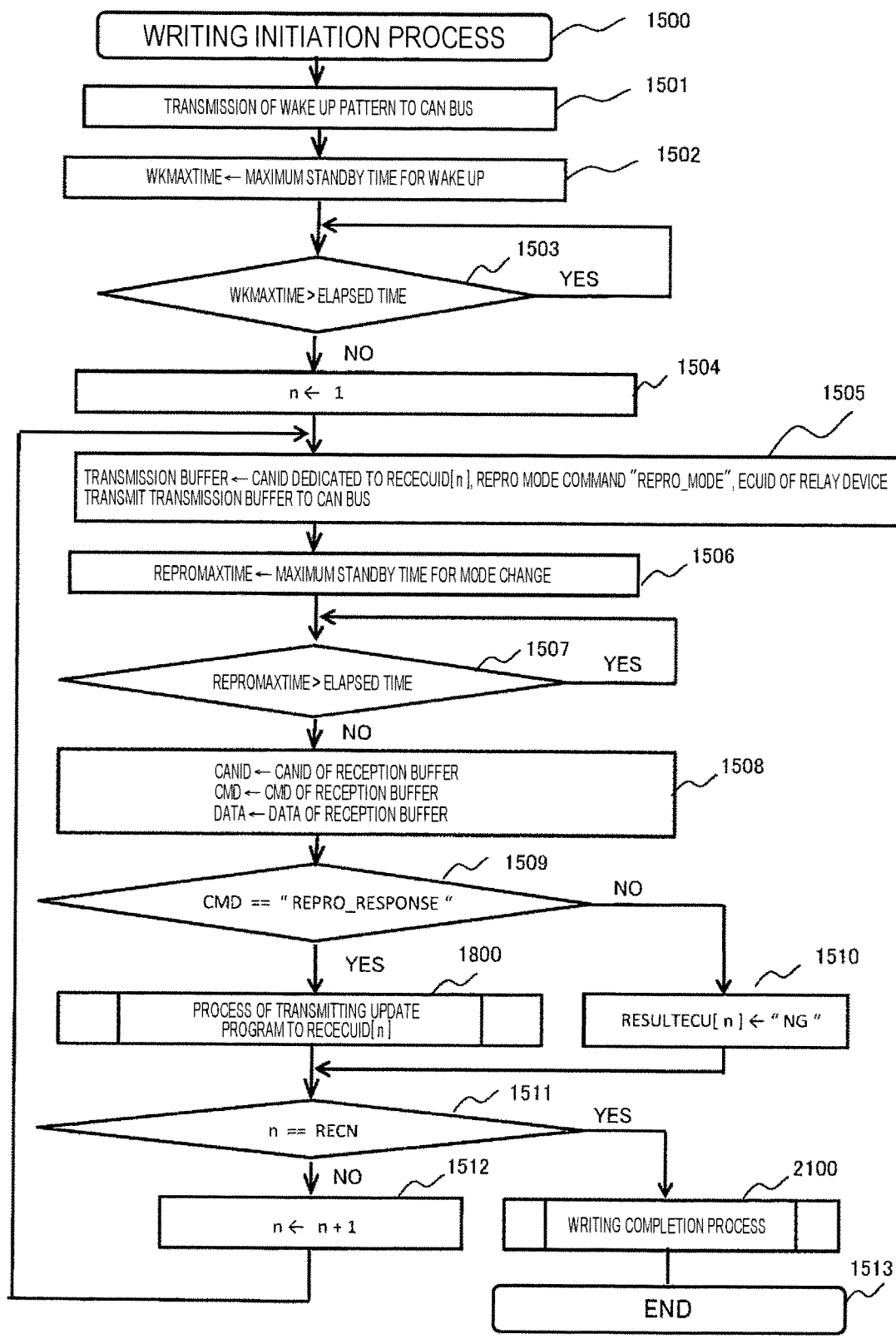
FIG. 15 is a diagram illustrating a writing initiation process.
Figure 16:
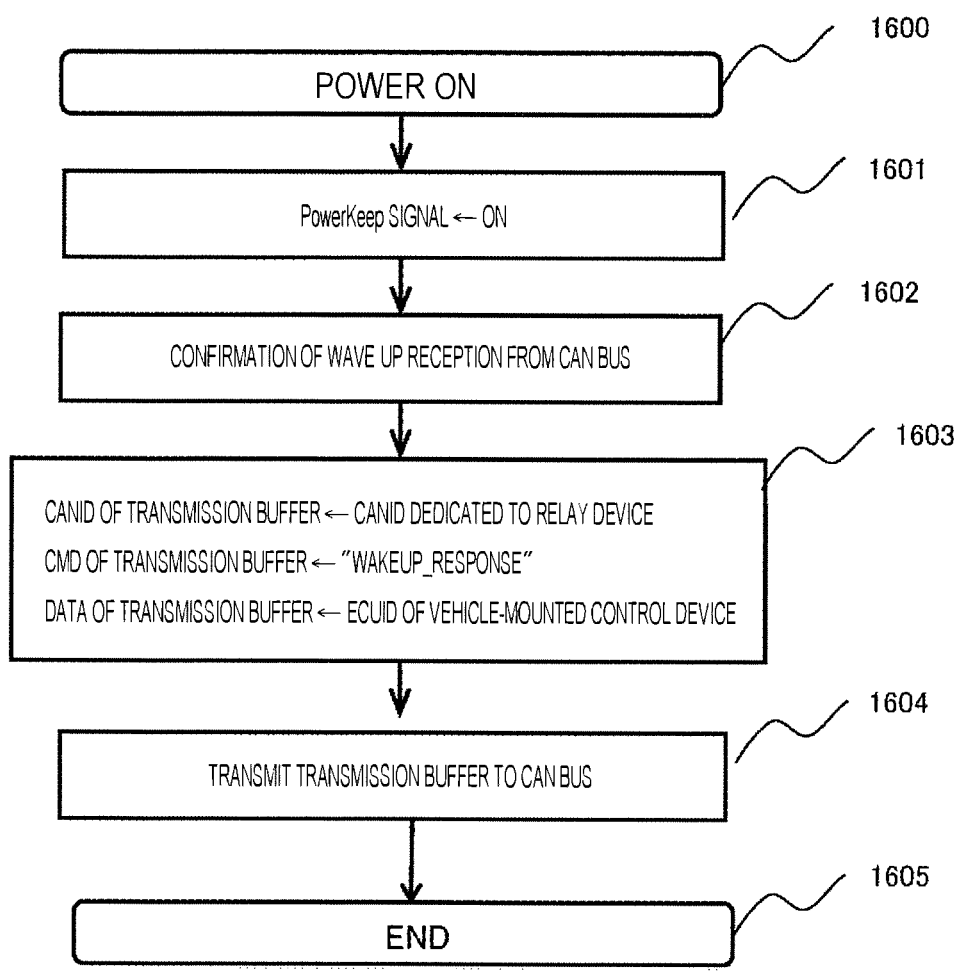
FIG. 16 is a diagram illustrating wake up reception process in the vehicle-mounted control device.

Hereinbefore, description has been given of the vehicle-mounted control device with reference to FIG. 17, and description will return to step 1508 in FIG. 15 with respect to the relay device. In step 1508, data of the CANID field of the reception buffer is set to the variable CANID, data of the CMD field of the reception buffer is set to a variable CMD, and data of the DATA field of the reception buffer is set to the variable DATA. Next, in step 1509, a check is made on whether or not the variable CMD is "REPRO-RESPONSE". Here, the check result is YES, a process of transmitting an update program to a vehicle-mounted control device of RECECUID[n] is executed in step 1800. If the check result is NO, it can be said that the vehicle-mounted control device of RECECUID[n] is abnormal, "NG" is set to a writing completion bit sequence RESULTECU[n] of the vehicle-mounted control device in step 1510. Even when one kind of the abnormality occurs, the writing initiation command fails. Next, in step 1511, a check is made on whether or not the variable n and RECN match each other. If matching is not established, n is incremented in step 1512, and execution of step 150 is repeated.

That is, a check is made on whether or not the entirety of update programs and update data which are received are completely transmitted to a corresponding vehicle-mounted control device, and in a case where the transmission process in step 1800 is completed, a writing completion process in step 2100 is executed to terminate the process.

Next, details of the process of transmitting the update program to RECECUID[n] in step 1800 will be described with reference to FIG. 18. In addition, the writing completion process in step 2100 will be subsequently described.

Figure 18:
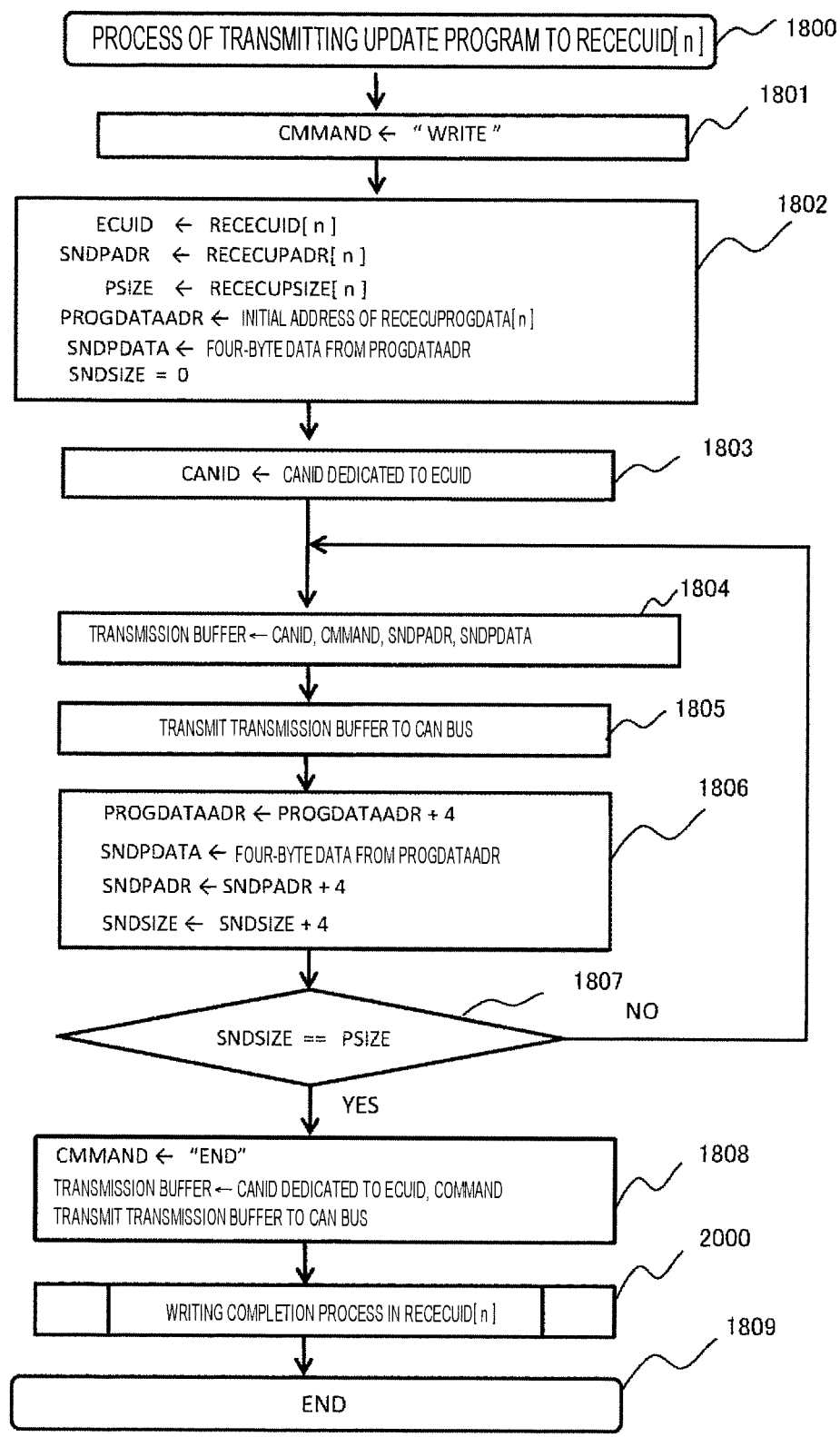
FIG. 18 is a diagram illustrating a process in a relay device that transmits update program to the vehicle-mounted control device indicated by the vehicle-mounted control device No. RECECUID[n].

FIG. 18 illustrates the process of transmitting the update program to RECECUID[n]. The relay device performs a process of transmitting the update program and the update data to the vehicle-mounted control device of RECECUID[n] by four-byte unit, receiving a writing completion result after completion of transmission from the vehicle-mounted control device, and storing the result.

First, in step 1801, a command "WRITE" is set to a variable CMMAND. In step 1802, RECECUID[n] is set to a variable ECUID, ERCECUPADR[n] is set to a variable SNDPADR, RECECUPSIZE[n] is set to a variable PSIZE, an initial address of RECECUPROGDATA[n] is set to a variable PROGDATAADR, four-byte data from PROGDATAADR is set to a variable SNDPDATA, and "0" is set to a variable SNDSIZE. Next, in step 1803, CANID dedicated to the vehicle-mounted control device ECUID, which is a transmission destination, is set to a variable CANID. In step 1804, a variable CANID is set to the CANID field of the transmission buffer, the variable CMMAND is set to the CMD field of the transmission buffer, the variable SNDPADR is set to a PADR field of the transmission buffer, and the variable SNDPDATA is set to the DATA field of the transmission buffer. In step 1805, the contents of the transmission buffer are transmitted to the CAN bus. Through the above-described process, the initial writing address of the update program and the update data, and the initial four-byte data of the update program and the update data can be transmitted to the vehicle-mounted control device. Next, in step 1806, a preparation is made to transmit next four-byte data of the update program and the update data. That is, the variable PROGDATAADR is incremented by four, four-byte data from an address indicated by the variable PROGDATAADR is set to the variable SNDPDATA, the variable SNDPADR is incremented by four, and the variable SNDSIZE is incremented by four. According to this, next four-byte data of the update program and the update data, and the writing address are respectively set. Next, in step 1807, a check is made on whether or not the variable SNDSIZE and the variable PSIZE match each other so as to make a check on whether or not the update program and the update data are transmitted to the vehicle-mounted control device. When the check result is NO, the process returns to step 1804, and the transmission process is repeated. When the check result is YES, step 1808 is executed. In step 1808, "END" indicating completion of transmission is set to the variable CMMAND, CANID dedicated to ECUID is set to the CANID field of the transmission buffer, and the variable CMMAND is set to the CMD field of the transmission buffer, and the contents of the transmission buffer are transmitted to the CAN bus. Through the above-described process, the update program and the update data are completely transmitted to the vehicle-mounted control device of RECECUID[n], and thus the writing completion process in RECECUID[n] is executed in step 2000 to terminate process. In the process illustrated in FIG. 18, execution is performed from step 1800 in FIG. 15, and thus as can be seen from step 1511 in FIG. 15, the entirety of update program and the update data are transmitted.

Hereinbefore, description has been given of the process of transmitting the update program and the update data to the vehicle-mounted control device from the relay device, and description will be given of a writing process in a vehicle-mounted control device that receives the update program and the update data with reference to FIG. 19. In addition, a writing completion process in RECECUID[n] in step 2000 will be described later.

Figure 19:
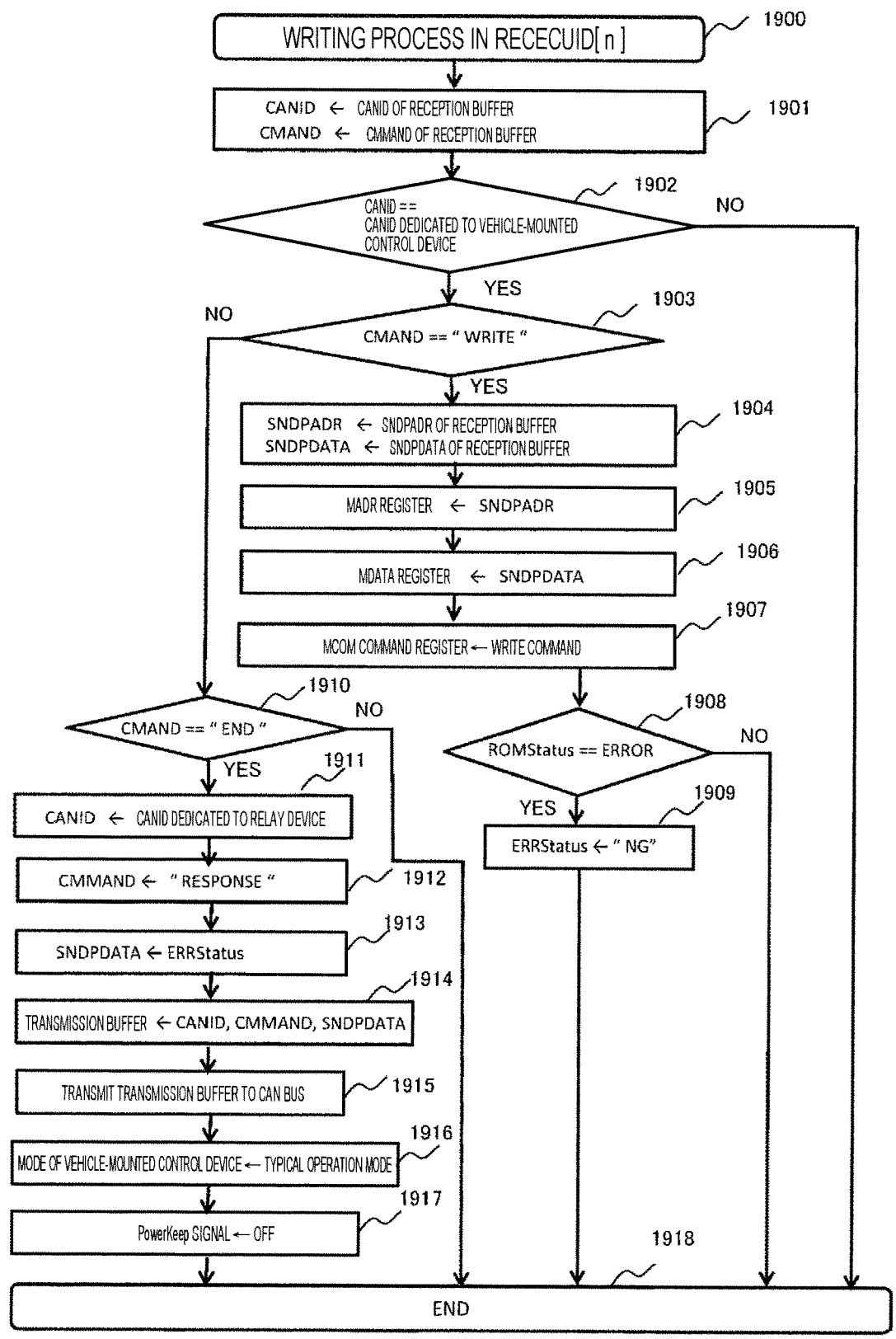
FIG. 19 is a diagram illustrating a writing process in the vehicle-mounted control device indicated by the vehicle-mounted control device No. RECECUID[n].

FIG. 19 represents the writing process in RECECUID[n].

The writing process in the vehicle-mounted control device RECECUID[n] is activated at a reception interrupt. This program executes a process of writing the update program and the update data in a region of the area 8A03, in which a control program and data of the vehicle-mounted control device are stored, in FIG. 8A. This region is a flash memory. Accordingly, normally, it is necessary to erase a program and data, which are already written in this region at first. However, in this example, an erasing process has no relation with the gist of the invention, and thus the erasing process is omitted for simplification. In step 1901, data of the CANID field of the reception buffer is set to the variable CANID, and data of the CMD field of the reception buffer is set to the variable CMAND. Next, in step 1902, a check is made on whether or not the variable CANID and CANID of own vehicle-mounted control device match each other. When the check result is NO, data is determined as transmission data for another vehicle-mounted control device, and the process is terminated. When the check result is YES, in step 1903, a check is made on whether or not the variable CMAND is "WRITE". When the check result is YES, determination is made as a writing command. In step 1904, data SNDPADR of the PADR field of the reception buffer is set to the variable SNDPADR, and data SNDPDATA of the DATA field of the reception buffer is set to the variable SNDPDATA. Next, step 1905 to step 1907 relate to a process of rewriting the control program and the data in 8A03 illustrated in FIG. 8A. First, the variable SNDPADR is set to a writing address setting register MADR in step 1905, the variable SNDPDATA is set to a writing data setting register MDATA in step 1906, and a writing command WRITE is set to a command register MCOM in step 1907. Execution of writing is initiated from the point of time at which the WRITE command is set to the MCOM resister, and thus the variable SNDPDATA, which holds four-byte data of the update program and the update date, is written in the address SNDPADR of the region 8A03. Next, in step 1908, determination is made on whether or not an error ERROR is detected in a state register ROMStatus so as to check whether or not writing is successful. In a case where the determination result is YES, it represents that four-byte writing fails, and thus "NG" is set to a variable ERRStatus in step 1909, and the process is terminated. If the determination result is NO, the four-byte writing is successful, and thus the process is terminated. The above-described process is a four-byte writing process, but this process is a process that is executed on the basis of data that is transmitted in step 1805 in FIG. 18. In FIG. 18, the process of transmitting the entirety of the update program and the update data is repeated in step 1807, and thus this process is also repeated whenever the update program and the update data are received. On the other hand, the result in step 1903 is NO, the following process is executed. Specifically, after completion of writing of the entirety of the update program and the update data, a check is made on whether or not a command "END" is transmitted from the relay device, and the relay device is notified of completion of writing in the control device. First, in step 1910, a check is made on whether or not the variable CMAND is "END", and when the check result is NO, the process is terminated. When the check result is YES, CANID dedicated to the relay device is set to the variable CANID in step 1911, "RESPONSE" indicating a response of "END" to the variable CMMAND in step 1912, and the variable ERRStatus is set to the variable SNDPDATA in step 1913. In step 1914, the variable CANID is set to the CANID field of the transmission buffer, the variable CMMAND is set to the CMD field of the transmission buffer, and the variable SNDPDATA is set to the DATA field of the transmission buffer. Subsequently, in step 1915, the contents of the transmission buffer are transmitted to the CAN bus. As described above, the relay device is notified of the four-byte writing process and the result thereof. Accordingly, subsequently, the operation mode of the vehicle-mounted control device is changed from the repro mode to the typical operation mode in step 1916, and the PowerKeep signal is turned off in step 1917 to terminate the process.

Next, the writing completion process in RECECUID[n] in step 2000, which is executed from FIG. 18, will be described in detail.

Figure 20:
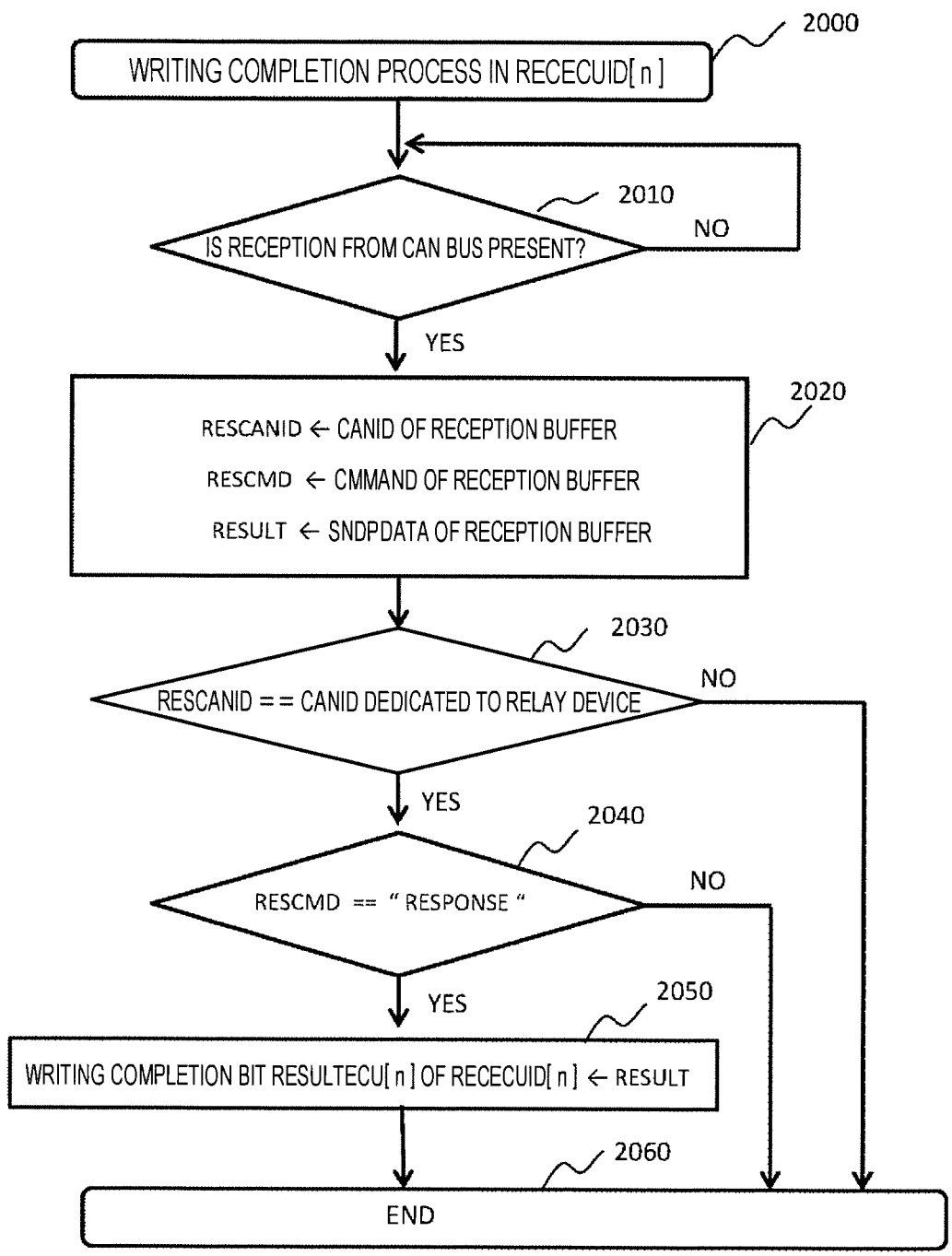
FIG. 20 is a diagram illustrating a process in the relay device that stores a writing completion result, which is transmitted by the vehicle-mounted control device indicated by the vehicle-mounted control device No. RECECUID[n], in a sequence RESULTECU[n].

FIG. 20 illustrates the writing completion process in RECECUID[n]. In step 2010, a check is made on whether or not "reception from the CAN bus is present". This relates to a process of checking reception of a "RESPONSE" response from the vehicle-mounted control device RECECUID[n]. When the check result is YES, data CANID of the CANID field of the reception buffer is set to a variable RESCANID in step 2020, data CMMAND of the CMD field of the reception buffer is set to a variable RESCMD, and data SNDPDATA of the data field of the reception buffer is set to a variable RESULT. Next, in step 2030, a check is made on whether or not the variable CANID and the CANID dedicated to the relay device match each other. When the check result is NO, the process is terminated because data is not data received by the relay device. If the check result is YES, in the subsequent step 2040, a check is made on whether or not the variable RESCMD and a command "RESPONSE" match each other, and if the check result is NO, the process is terminated. When the check result is YES, a writing completion result is stored in the variable RESULT, and thus in the subsequent step 2050, the variable RESULT is stored in a writing completion bit sequence RESULTECU[n] of RECECUID, and the process is terminated. As described above, the writing completion result of the update program and the update data of RECECUID[n] is stored in RESULTECU[n].

Figure 14:
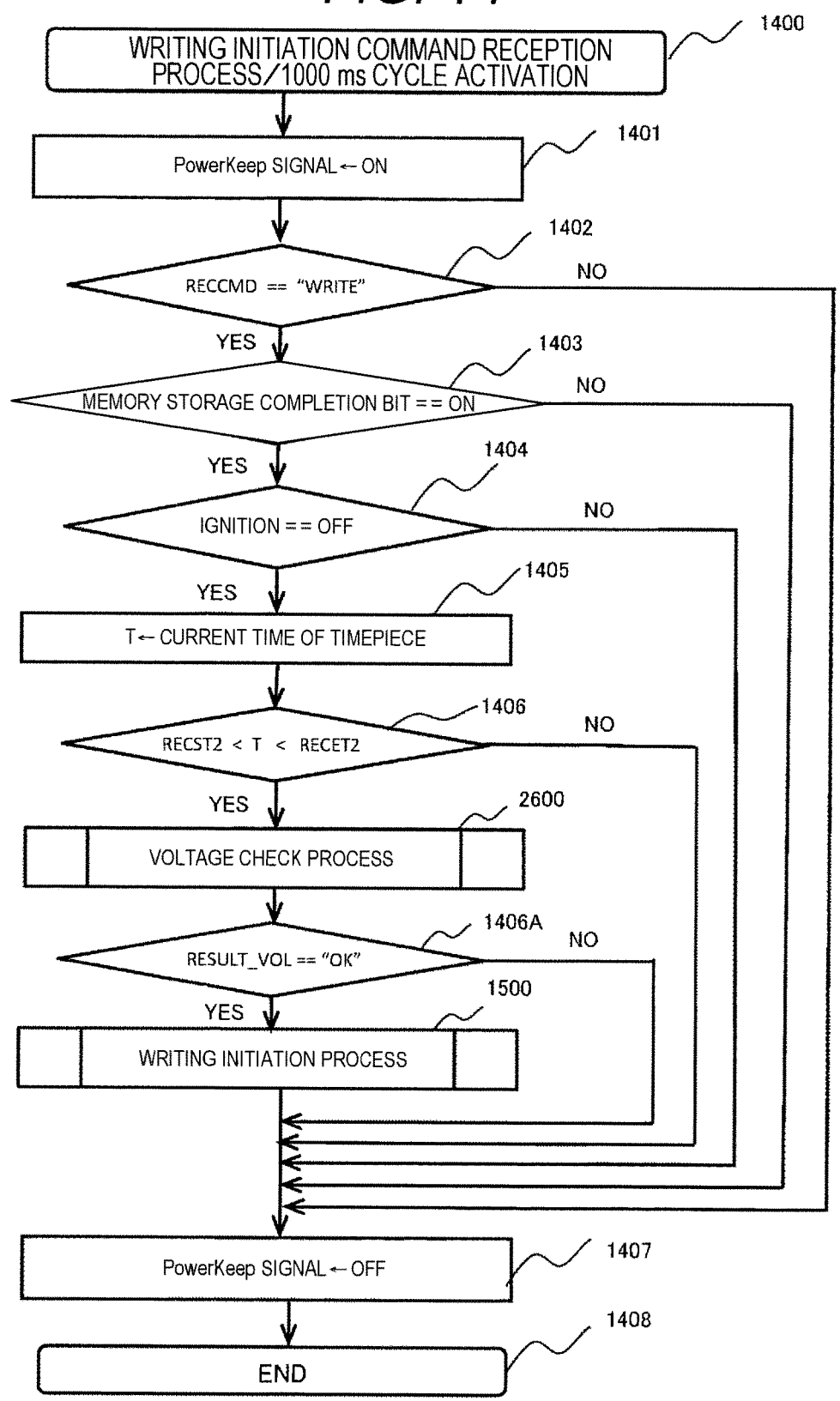
FIG. 14 is a diagram illustrating a writing initiation command reception process.

As can be seen from the entire configuration of the process, initiation of writing begins to start from the process in FIG. 14. When writing initiation conditions are established, the writing process in FIG. 15 is executed. Here, a process of calling the process of writing the entirety of the update programs and the update data in the vehicle-mounted control device is repeated. The process of transmitting the update program to RECECUID[n] as illustrated in FIG. 18 is present during the repetition, and the writing completion process in RECECUID[n] as illustrated in FIG. 20 is executed during execution of the process in FIG. 18. Accordingly, the writing completion process in RECECUID[n] as illustrated in FIG. 20 is executed to the entirety of vehicle-mounted control devices which correspond to the update program and the update data.

Next, description will be given of the writing completion process in step 2100 illustrated in FIG. 15, which is executed after completion of writing in the vehicle-mounted control devices corresponding to the entirety of update programs and the update data, with reference to FIG. 21.

Figure 21:
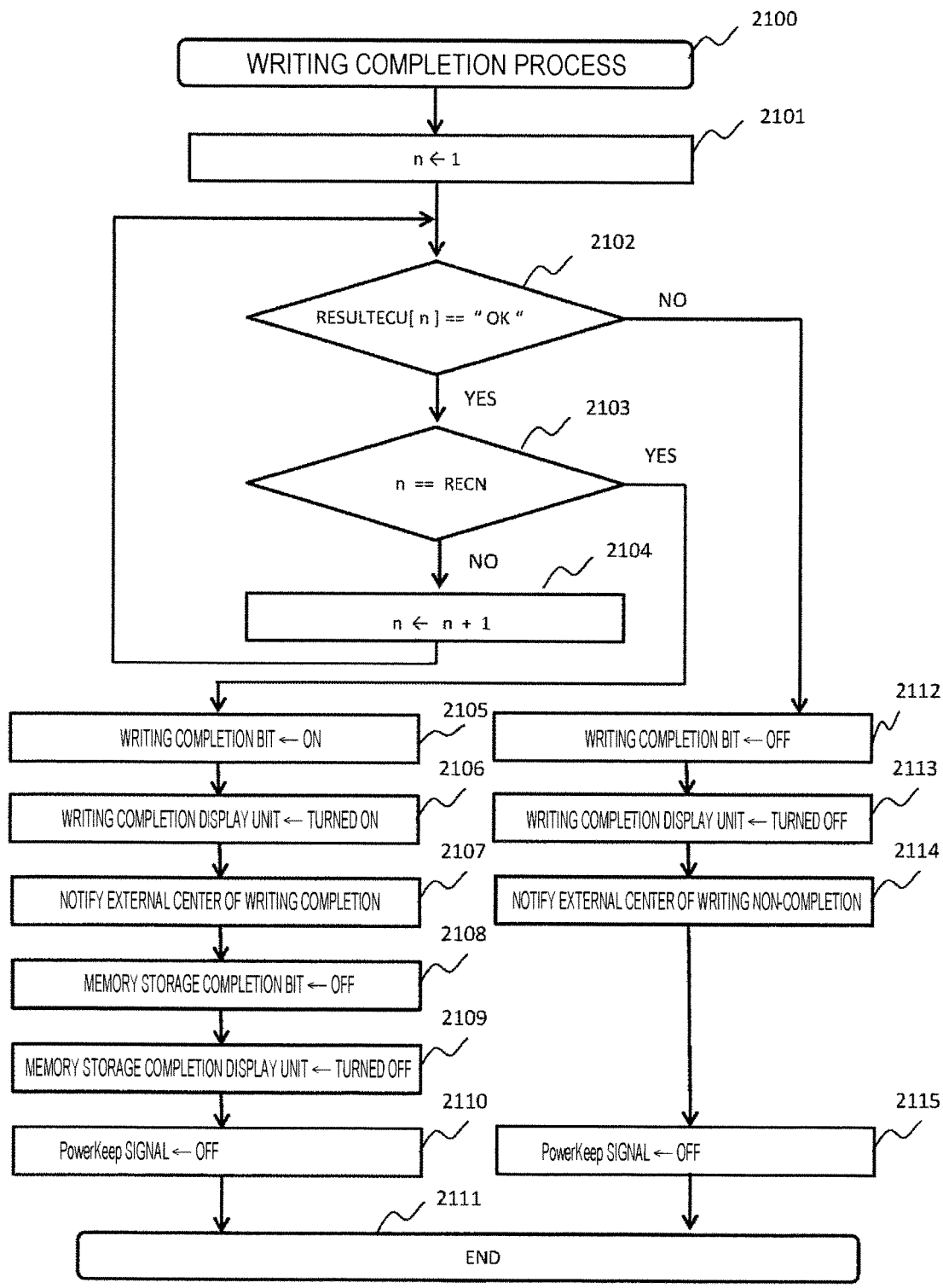
FIG. 21 is a diagram illustrating a writing completion process in the relay device.

FIG. 21 illustrates the writing completion process. In step 2101, "1" is set to a variable n, and in step 2102, a check is made on whether or not the writing completion bit RESULTECU[n] of the vehicle-mounted control device of RECECUID[n] is "OK". When the check result is NO, this result represents that writing abnormality occurs. Accordingly, the writing completion bit described in FIG. 7 is set to OFF in step 2112, and the writing completion display unit is turned off in step 2113, the external center is notified of writing incompletion indicating a writing failure in step 2114, and the PowerKeep signal of the relay device is finally turned off in step 2115 to terminate the process. On the other hand, when the check result is YES in step 2102, a check is made on whether the variable n and RECN match each other. When the check result is NO in step 2102, the variable N is incremented, and step 2102 is repeated. When the check result is YES, this result represents that the result of the entirety of writing processes is "OK". Accordingly, the writing completion bit is turned on in step 2105, the writing completion display unit is turned on in step 2106, the external center is notified of writing completion indicating that writing completion is normally terminated in step 2107, the memory storage completion bit is set to OFF in step 2108 because the entirety of processes are terminated, the memory storage completion display unit is turned off in step 2109, and the PowerKeep signal of the relay device is turned off in step 2110 to terminate the process.

Next, an example of a case of realizing writing initiation by using the writing initiation command button mounted in a vehicle will be described in detail. This case relates to the tenth to thirteenth aspects. In addition, this case also includes examples of the first to third aspects.

This example describes a detailed process operation of the writing process overview by using the writing button as illustrated in FIG. 10. However, the memory storage completion process in the relay device as illustrated in FIG. 11 has been described in detail, and thus description will be given of a process subsequent to step 1010 in FIG. 10.

Figure 22:
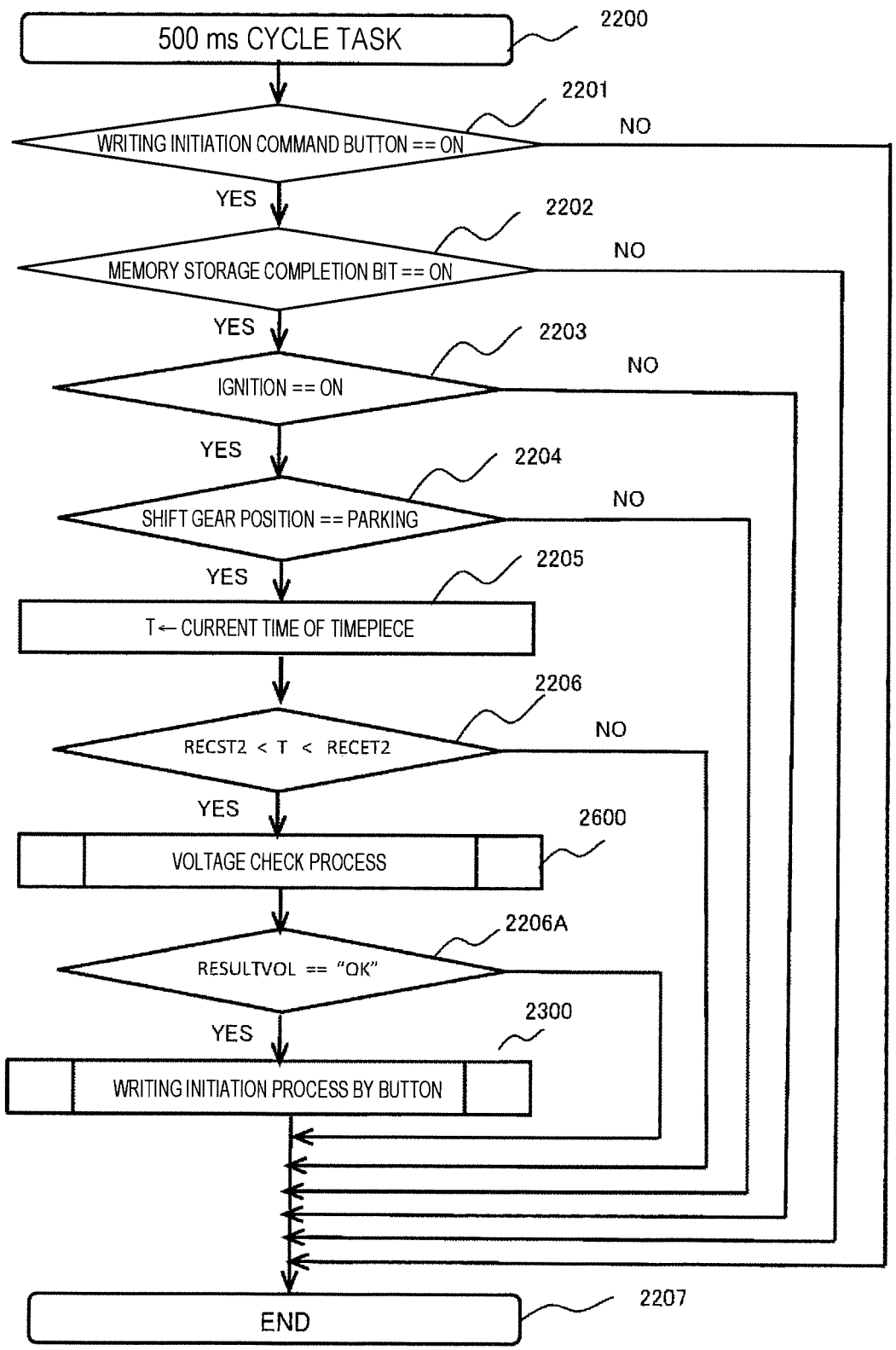
FIG. 22 is a diagram illustrating a writing initiation command process by a writing initiation command button.

FIG. 22 illustrates the writing initiation command process by using the writing initiation command button. This process program 2200 is a program that is activated at a cycle of 500 ms. When this program is activated, a check is made on whether or not the writing initiation command button is turned on in step 2201, and when the check result is NO, the process is terminated. If the check result is YES, a check is made on whether or not the memory storage completion bit is turned on in step 2202, and when the check result is NO, the process is terminated. If the check result is YES, a check is made on whether or not the ignition is turned on in step 2203, and when the check result is NO, the process is terminated. If the check result is YES, a check is made on whether or not the shift gear position is the parking position in step 2204, and when the check result is NO, the process is terminated. When the ignition is turned on, there is a possibility that a vehicle is in travel, and thus stoppage of the vehicle is confirmed from a situation in which the shift gear position is the parking position. If the check result is YES, current time is obtained from the timepiece, and the current time is set to a variable T in step 2205. Next, a check is made on whether or not the writing initiation command button is pressed at the second time zone by using a determination result of RECST2<T<RECET2 in step 2206. If the check result is NO, writing is not performed, and the process is terminated. If the check result is YES, the voltage check process 2600 in the no-load state and the load-connected state is executed. After the execution, a check is made on whether or not the variable RESULTVOL is "OK" in step 2206A, and when the check result is YES, the writing initiation process by using the button in step 2300 is executed, and the process is terminated. When the check result is NO, the process is terminated without any execution. Here, with regard to the variable RESULTVOL, in the voltage check process, if the battery voltage in the no-load state and the load-connected state is equal to or greater than the reference voltage, "OK" is set, and if the battery voltage is equal to or less than the reference voltage, "NG" is set. Details thereof will be described in FIG. 26.

The above-described process corresponds to an example of the thirteenth aspect. An example of the tenth aspect corresponds to a process flow in which step 2203, step 2204, step 2205, and step 2206 are omitted. An example of the eleventh aspect corresponds to a process flow in which step 2205 and step 2206 are omitted, and an example of twelfth aspect corresponds to a process flow in which step 2203 and step 2204 are omitted.

Figure 26:
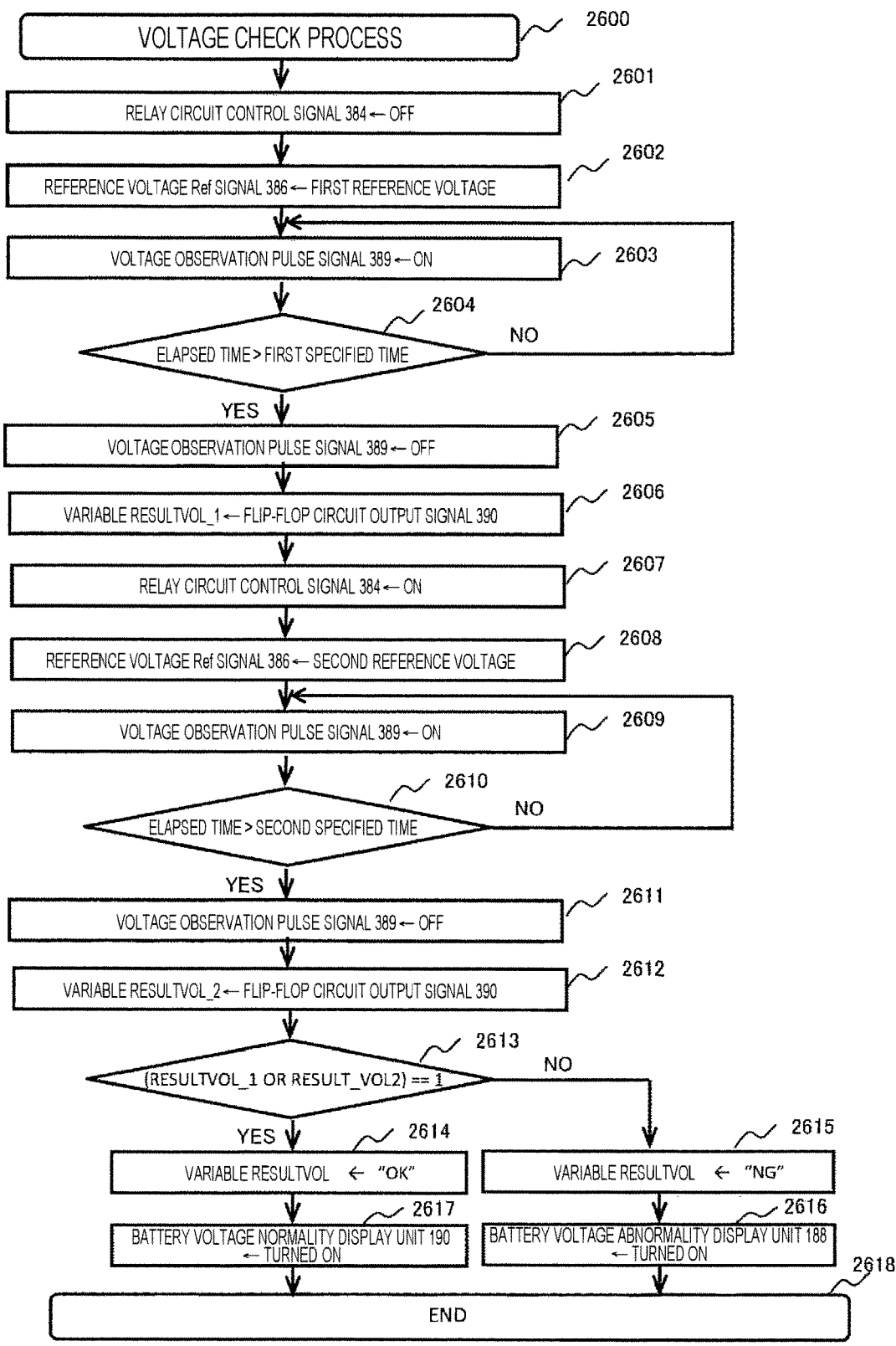
FIG. 26 is a diagram illustrating a voltage check process.

FIG. 26 illustrates the voltage check process.

First, the battery voltage check in the no-load state is performed, and then the battery voltage check in the load-connected state is performed. First, OFF is output to the control signal 384 of the relay circuit in step 2601. As a result thereof, the load 381 is not connected to the battery power line 173, and enters the no-load state. Next, a first reference voltage is output to a reference voltage Ref signal 386 in step 2602, and the voltage observation pulse signal 389 is turned on in step 2603. A check is made on whether or not elapsed time is equal to or greater than first specified time in step 2604, and when the check result is NO, step 2603 is repetitively executed. When the check result is YES, the voltage observation pulse signal 389 is turned off in step 2605, and the flip-flop circuit output signal 390 is set to a variable RESULTVOL_1 in step 2606.

Through the above-described process, the battery voltage in the no-load state is equal to or greater than the first reference voltage, or the result thereof is set to the variable RESULTVOL_1.

Next, the battery voltage check in the load-connected state is performed. The relay circuit control signal 384 is turned on in step 2607. According to this, the battery power line 173 and the load 381 are connected to each other. Next, the second reference voltage is set to the reference voltage Ref signal 386 in step 2608, and the voltage observation pulse signal 389 is turned on in step 2609. Next, a check is made on whether or not the elapsed time is equal to or greater than a second specified time in step 2610, and when the check result is NO, step 2609 is repeated. If the check result is YES, the voltage observation pulse signal 389 is turned off in step 2611, and the flip-flop circuit output signal 390 is set to a variable RESULTVOL_2 in step 2612.

Through the above-described process, the battery voltage in the load-connected state is equal to or greater than the second reference voltage, or a result thereof is set to the variable RESULTVOL_2.

Next, in step 2613, an OR operation of the variable RESULVOL_1 or the variable RESULVOL_2 is performed to check whether or not the result is "1". When the check result is NO, "NG" is set to the variable RESULTVOL in step 2615, and the battery voltage abnormality display unit 188 is turned on in step 2616 to terminate the process. If the check result is YES, "OK" is set to the variable RESULTVOL in step 2614, and the battery voltage normality display unit 190 is turned on in step 2617 to terminate the process.

Hereinbefore, the voltage check process in the no-load state and the load-connected state has been described.

Figure 23:
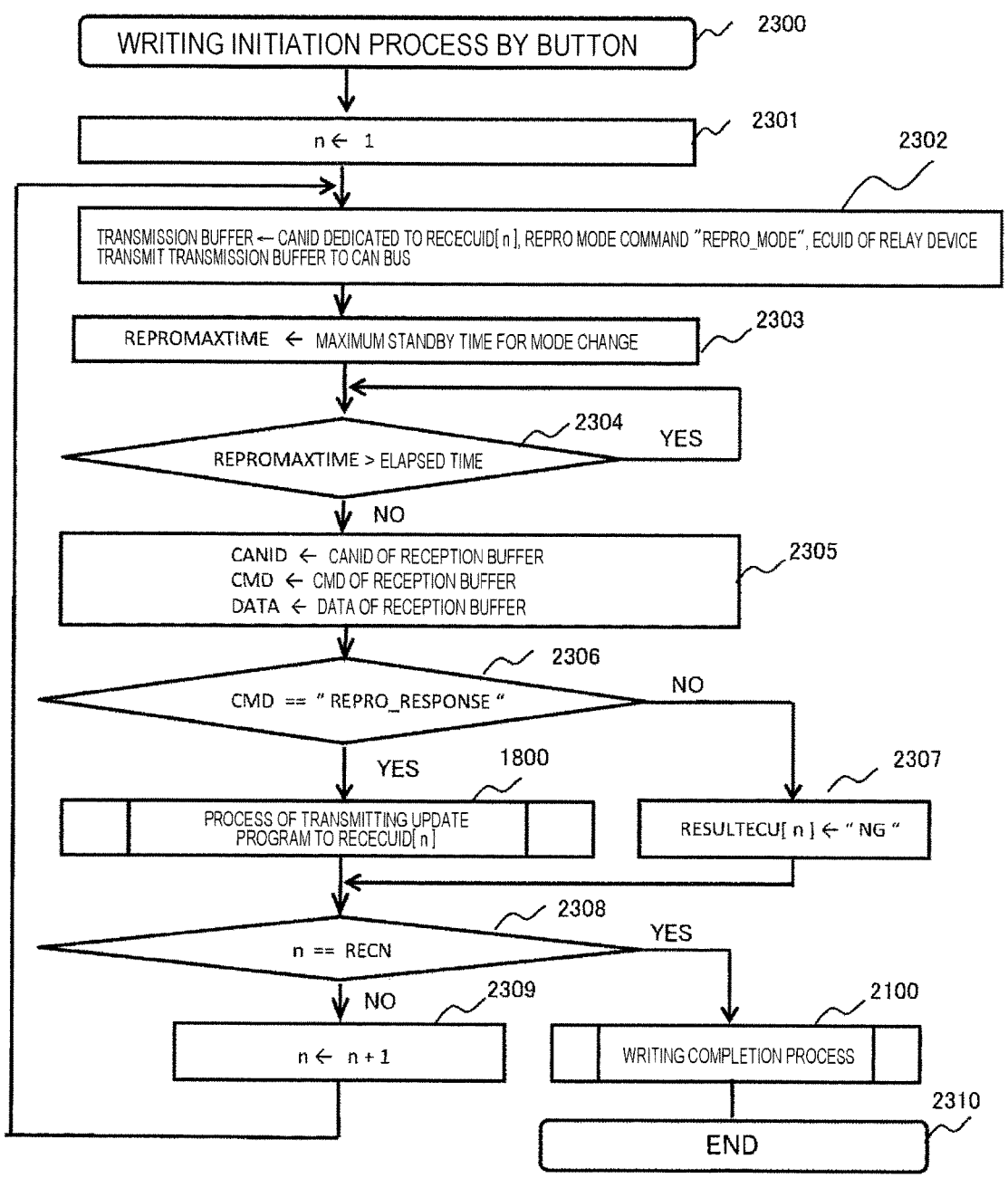
FIG. 23 is a diagram illustrating a writing initiation process by a button.

Next, the writing initiation process by using the button in FIG. 23 will be described in detail.

In step 2301, "1" is set to a variable n. In step 2302, CANID dedicated to RECECUID[n] is set to the CANID field of the transmission buffer, the repro mode command "REPRO_MODE" is set to the CMD field of the transmission buffer, ECUID of the relay device is set to the DATA field of the transmission buffer, and the contents of the transmission buffer are transmitted to the CAN bus. Since the ignition is turned on and the power of the vehicle-mounted control device is turned on, in the above-described process, the relay device does not transmit the wake up pattern, and transmits a repro mode transition request command "REPRO_MODE". Next, the maximum standby time for mode change is set to the variable REPROMAXTIME in step 2303, and a standby process is performed until the REPROMAXTIME time has elapsed in step 2304. When the time has elapsed, the result becomes NO, and in step 2305, data CANID of the CANID field of the reception buffer is set to the variable CANID, data CMD of the CMD field of the reception buffer is set to the variable CMD, data DATA of the DATA field of the reception buffer is set to the variable DATA. Next, in step 2306, a check is made on whether or not the variable CMD and the "REPRO_RESPONSE" match each other. When the check result is NO, determination is made as abnormality, and "NG" is set to RESULTECU[n] in step 2307. If the check result is YES, "process of transmitting update program to RECECUID[n]" in step 1800 is performed, and a check is made on whether or not the variable n and RECN match each other in step 2308. When the check result is NO, the entirety of update programs and update data are not transmitted. Accordingly, the variable n is incremented in step 2309, and step 2302 is repetitively executed. If the check result in step 2308 is YES, the writing completion process in step 2100 is executed to terminate the process. The above described processes 2301 to 2310 are the same as step 1504 to step 1513 in FIG. 15. Accordingly, it is not necessary to describe "the process of transmitting the update program to RECECUID[n]" in step 1800 and the writing completion process in step 2100, and thus description thereof will be omitted.

Figure 27:
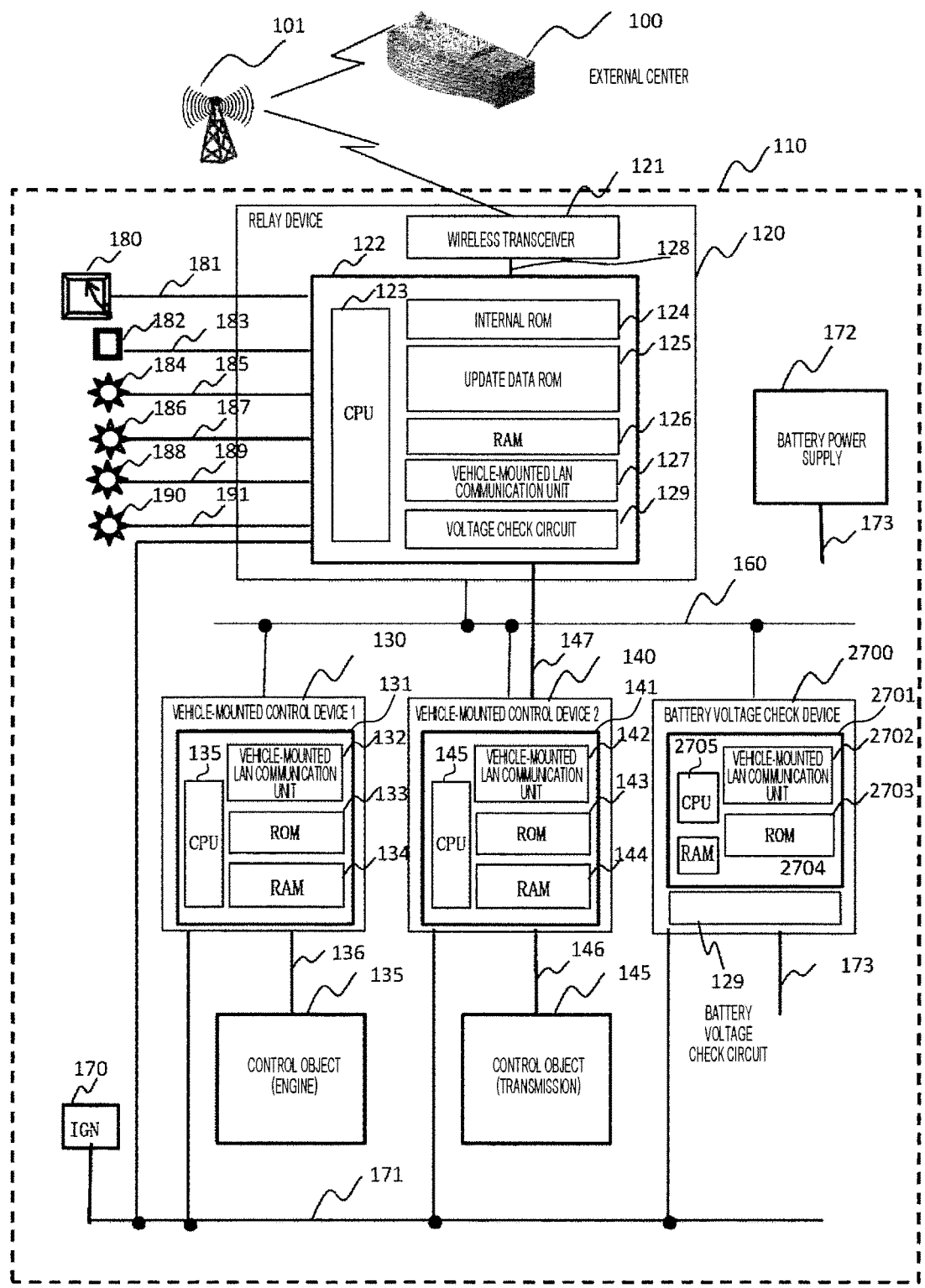
FIG. 27 is a configuration diagram of a battery voltage check device.

FIG. 27 illustrates the battery voltage check device in which the battery voltage check circuit is embedded. It is not necessary for the battery voltage check circuit to be provided to only the relay device. According to this configuration, it is possible to determine whether or not writing can be performed by connecting the battery voltage check device in which the battery voltage check circuit is embedded to the vehicle-mounted network, and by acquiring a signal indicating a voltage check result from the battery voltage check device through the vehicle-mounted network before writing the update program and the update data. In FIG. 27, a reference numeral 2700 represents a battery voltage check device, a reference numeral 2701 represents a microcomputer, a reference numeral 2702 represents a vehicle-mounted LAN communication unit, a reference numeral 2703 represents a ROM, a reference numeral 2704 represents a RAM, a reference numeral 173 represents a battery power line, and a reference numeral 129 represents a battery voltage check circuit. The battery voltage check device monitors the voltage of battery 172 from the power line 173 by using the battery voltage check circuit 129 for a constant period, and notifies the relay device 120 of the result by using the vehicle-mounted network.

Hereinbefore, details of examples of the fourth to seventh aspects, and the tenth to thirteenth aspects have been described. In addition, examples of the first to third aspects, and the eighth and ninth aspects also have been described in the detailed description.

An example of the fourteenth aspect is realized when update map data is dealt instead of the update program data in the example of the first aspect, and thus description thereof will be omitted.

An example of the fifteenth aspect is different from the example of the first aspect in that the embedded battery voltage check circuit is not provided to the relay device, the battery voltage check circuit is embedded in the battery voltage check device, and the relay device is notified of the battery voltage check result signal through the vehicle-mounted network, and thus detailed description thereof will be omitted.

Hereinbefore, an example of the invention has been described. However, according to the invention, the vehicle-mounted relay device can receive the update program data, which is transmitted from the external center, in a state in which the ignition in a battery charging state is in an on-state during vehicle travel and the like. In addition, the relay device can stably store the update program data without causing inconvenience to a driver regardless of the vehicle-mounted control device in accordance with travel. In addition, with regard to the update program and data writing process, in a case where a driver does not get on a vehicle, even in a case where the vehicle is parked in a home or another parking lot, a case of the middle of night, or a case where the ignition is turned off, it is possible to stably write the update program and the update data in the vehicle-mounted control device at a time zone that is promised to a vehicle owner by performing the battery voltage check in the no-load state and the load-connected state. In addition, in a case where the driver gets on the vehicle, the battery voltage check in the no-load state and the load-connected state is performed by pressing the writing initiation command button at time convenient for the driver after the ignition is set to an on-state, and a shift gear position of the vehicle is set to parking, and writing is stably performed when the resultant battery voltage is equal to or greater than a reference voltage. In addition, a check is made on whether writing time is in a range of the second time zone, and thus it is possible to perform writing at a time zone promised to the vehicle owner.

According to this, it is possible to stably write the update program and the update data in the vehicle-mounted control device without causing inconvenience to the driver.

REFERENCE SIGNS LIST

120 relay device
130, 140, 150 vehicle-mounted control device
129 voltage check circuit
160 vehicle-mounted network
2700 battery voltage check device

The invention claimed is:
1. A vehicle-mounted program writing device, comprising:
  a plurality of vehicle-mounted control devices which control an operation of a device that is mounted in a vehicle with a control program; and
  a relay device that receives update program data which includes an update program and update data of the vehicle-mounted control device and is transmitted from an external center, and stores the update program data in a memory,
    wherein the vehicle-mounted control devices and the relay device are connected through a vehicle-mounted network,
    wherein the relay device includes a battery voltage check circuit configured to perform a battery voltage check of a battery voltage in a no-load state and a load-connected state before writing the update program and the update data in the vehicle-mounted control devices, and
    wherein writing the update program and the update data in the vehicle-mounted control devices is performed when (i) the battery voltage is equal to or greater than a first reference voltage in the no-load state, or (ii)

the battery voltage is equal to or greater than a second reference voltage in the load-connected state, the first reference voltage different from the second reference voltage.

2. The vehicle-mounted program writing device according to claim 1,
wherein the relay device includes a battery voltage abnormality display unit, and
the battery voltage check in the no-load state and the load-connected state is performed with the battery voltage check circuit, and in a case where the battery voltage is equal to or less than the first reference voltage and equal to or less than the second reference voltage, the battery voltage abnormality display unit is turned on.

3. The vehicle-mounted program writing device according to claim 1,
wherein the relay device includes a battery voltage normality display unit, and
the battery voltage check in the no-load state and the load-connected state is performed with the battery voltage check circuit, and in a case where the battery voltage is equal to or greater than the first reference voltage or equal to or greater than the second reference voltage, the battery voltage normality display unit is turned on.

4. A vehicle-mounted program writing device, comprising:
a plurality of vehicle-mounted control devices which control an operation of a device that is mounted in a vehicle with a control program; and
a relay device that receives update program data which includes an update program and update data of the vehicle-mounted control device and is transmitted from an external center, and stores the update program data in a memory,
wherein the vehicle-mounted control devices have a typical operation mode in which the control program is executed, and a repro mode in which the control program is rewritten in the update program,
the vehicle-mounted control devices and the relay device are connected through a vehicle-mounted network,
the relay device includes:
a battery voltage check circuit;
a unit that receives the update program data, which is transmitted from the external center before a first time zone that is determined in advance, of the plurality of vehicle-mounted control devices in a case where an ignition is in an on-state; and
a unit that performs battery voltage check in a no-load state and a load-connected state with the battery voltage check circuit when receiving a writing indication command transmitted from the external center in the first time zone, and wakes up the vehicle-mounted control devices when the battery voltage is equal to or greater than a first reference voltage in the no-load state, or equal to or greater than a second reference voltage in the load-connected state for transition to the repro mode;
the vehicle-mounted control device notifies the relay device of the repro mode transition; and
the relay device executes writing of the update program and the update data in the vehicle-mounted control devices in the first time zone on the basis of the repro mode transition notification from the vehicle-mounted control devices, and whether or not the update program data, which is stored in the memory, of the vehicle-mounted control devices is present.

5. The vehicle-mounted program writing device according to claim 4, further comprising:
a unit that performs the battery voltage check in a no-load state and a load-connected state with the battery voltage check circuit in a case where a writing initiation command, which is transmitted from the external center in a range of the first time zone, is received, and the ignition is in an off-state, and wakes up the vehicle-mounted control devices when the battery voltage is equal to or greater than the first reference voltage in the no-load state, or equal to or greater than the second reference voltage in the load-connected state for transition to the repro mode,
wherein the vehicle-mounted control device notifies the relay device of the repro mode transition, and
the relay device executes writing of the update program and the update data in the vehicle-mounted control devices in the first time zone on the basis of the repro mode transition notification from the vehicle-mounted control devices, and whether or not the update program data, which is stored in the memory, of the vehicle-mounted control devices is present.

6. A vehicle-mounted program writing device, comprising:
a plurality of vehicle-mounted control devices which control an operation of a device that is mounted in a vehicle with a control program; and
a relay device that receives update program data which includes an update program and update data of the vehicle-mounted control devices, and a second time zone in which writing indication command is executed, and is transmitted from an external center, and stores the update program data in a memory,
wherein the vehicle-mounted control devices have a typical operation mode in which the control program is executed, and a repro mode in which the control program is rewritten in the update program,
the vehicle-mounted control devices and the relay device are connected through a vehicle-mounted network,
the relay device includes:
a battery voltage check circuit;
a unit that receives the update program data, which is transmitted from the external center before the second time zone, of the plurality of vehicle-mounted control devices in a case where an ignition is in an on-state; and
a unit that performs battery voltage check in a no-load state and a load-connected state with the battery voltage check circuit in the second time zone on the basis of a timepiece that is mounted in a vehicle, and wakes up the vehicle-mounted control devices when the battery voltage is equal to or greater than a first reference voltage in the no-load state, or equal to or greater than a second reference voltage in the load-connected state for transition to the repro mode,
the vehicle-mounted control device notifies the relay device of the repro mode transition, and
the relay device executes writing of the update program and the update data in the vehicle-mounted control devices in the second time zone on the basis of the repro mode transition notification from the vehicle-mounted control devices, and whether or not the update program data, which is stored in the memory, of the vehicle-mounted control devices is present.

7. The vehicle-mounted program writing device according to claim 6, further comprising:
a unit that performs the battery voltage check in a no-load state and a load-connected state with the battery voltage check circuit in the second time zone on the basis of the timepiece that is mounted in the vehicle in a case where the ignition is in an off-state, and wakes up the vehicle-mounted control devices when the battery voltage is equal to or greater than the first reference voltage in the no-load state, or equal to or greater than the second reference voltage in the load-connected state for transition to the repro mode,
wherein the vehicle-mounted control device notifies the relay device of the repro mode transition, and
the relay device executes writing of the update program and the update data in the vehicle-mounted control devices in the second time zone on the basis of the repro mode transition notification from the vehicle-mounted control devices, and whether or not the update program data, which is stored in the memory, of the vehicle-mounted control devices is present.

8. The vehicle-mounted program writing device according to claim 7,
wherein the relay device has vehicle-mounted battery voltage check function of turning on a memory storage completion display unit in the vehicle when reception of the update program data of the plurality of vehicle-mounted control devices from the external center is completed, and notifying the external center of memory storage completion.

9. The vehicle-mounted program writing device according to claim 8,
wherein the plurality of vehicle-mounted control devices include a unit that notifies the relay device of writing completion after completion of writing of the update program and the update data, and
the relay device turns on a writing completion display unit in the vehicle after receiving writing completion notification from all of the plurality of vehicle-mounted control devices, and notifies the external center of the update completion.

10. A vehicle-mounted program writing device, comprising:
a plurality of vehicle-mounted control devices which control an operation of a device that is mounted in a vehicle with a control program; and
a relay device that receives update program data which includes an update program and update data of the vehicle-mounted control device and is transmitted from an external center, and stores the update program data in a memory,
wherein the vehicle-mounted control devices have a typical operation mode in which the control program is executed, and a repro mode in which the control program is rewritten in the update program,
the vehicle-mounted control devices and the relay device are connected through a vehicle-mounted network,
the relay device includes:
a memory storage completion display unit;
a writing initiation command button;
a writing completion display unit;
a battery voltage check circuit; and
a unit that receives the update program data, which is transmitted from the external center, of the plurality of vehicle-mounted control device in a case where an ignition is in an on-state,
the memory storage completion display unit is turned on when the reception is completed,
in a case where the memory storage completion display unit is turned on and the writing initiation command button is turned on, battery voltage check of a battery voltage in a no-load state and a load-connected state is performed with the battery voltage check circuit, and when (i) the battery voltage is equal to or greater than a first reference voltage in the no-load state, or (ii) the battery voltage is equal to or greater than a second reference voltage in the load-connected state, writing of the update program and the update data in the vehicle-mounted control devices is initiated, wherein the first reference voltage is different from the second reference voltage,
the writing completion display unit is turned on after completing the writing, and
in a case where the memory storage completion display unit is turned off or the battery voltage is equal to or less than the first reference voltage and equal to or less than the second reference voltage, even when the writing initiation command button is turned on, writing of the update program and the update data is not executed.

11. The vehicle-mounted program writing device according to claim 10,
wherein in a case where the memory storage completion display unit is turned on, an ignition is in an on-state, a vehicle shift gear position is parking, and the writing initiation command button is turned on, the battery voltage check in the no-load state and the load-connected state is performed with the battery voltage check circuit, when the battery voltage is equal to or greater than the first reference voltage in the no-load state or equal to or greater than the second reference voltage in the load-connected state, writing of the update program and the update data in the vehicle-mounted control device is initiated, and the writing completion display unit is turned on after completion of the writing, and
in a case where the memory storage completion display unit is turned off, the ignition is in an off-state, the vehicle shift gear position is a position other than parking, or the battery voltage is equal to or less than the first reference voltage and equal to less than the second reference voltage, even when the writing initiation command button is turned on, the writing of the update program and the update data is not executed.

12. A vehicle-mounted program writing device, comprising:
a plurality of vehicle-mounted control devices which control an operation of a device that is mounted in a vehicle with a control program; and
a relay device that receives update program data which includes an update program and update data of the vehicle-mounted control devices, and a second time zone, and is transmitted from an external center, and stores the update program data in a memory,
wherein the vehicle-mounted control devices have a typical operation mode in which the control program is executed, and a repro mode in which the control program is rewritten in the update program,
the vehicle-mounted control devices and the relay device are connected through a vehicle-mounted network, and
the relay device includes:
a memory storage completion display unit;
a writing initiation command button;

a writing completion display unit;
a battery voltage check circuit;
a unit that receives the update program data, which is transmitted from the external center, of the plurality of vehicle-mounted control device in a case where an ignition is in an on-state;
a unit that turns on the memory storage completion display unit in a case where reception is completed; and
a unit that performs battery voltage check in a no-load state and a load-connected state with the voltage check circuit in a case where the memory storage completion display unit is turned on, and detection time when detecting turning-on of the writing initiation command button is in a range of the second time zone, executes writing of the update program and the update data in the vehicle-mounted control device in the second time zone in a case where the battery voltage is equal to or greater than a first reference voltage in the no-load state or equal to or greater than a second reference voltage in the load-connected state, and does not execute the writing in a case where the writing completion display unit is turned on after completion of the writing with respect to the plurality of vehicle-mounted control device, the memory storage completion display unit is turned off, the detection time is out of the range of the second time zone, or the battery voltage is equal to or less than the first reference voltage and equal to or less than the second reference voltage.

13. The vehicle-mounted program writing device according to claim 12, further comprising:
a unit that performs the battery voltage check in the no-load state and the load-connected state with the voltage check circuit in a case where the memory storage completion display unit is turned on, an ignition is in an on-state, a vehicle shift gear position is parking, and detection time when detecting turning-on of the writing initiation command button is in a range of the second time zone, performs writing of the update program and the update data in the vehicle-mounted control device in the second time zone in a case where the battery voltage is equal to or greater than the first reference voltage in the no-load state or equal to or greater than a second reference voltage in the load-connected state, and does not perform the writing in a case where the writing completion display unit is turned on after completion of the writing with respect to the plurality of vehicle-mounted control devices, the memory storage completion display unit is turned off, the ignition is in an off-state, the vehicle shift gear position is a position other than parking, the detection time of the turning-on of the writing initiation command button is out of the range of the second time zone, or the battery voltage is equal to or less than the first reference voltage and equal to or less than the second reference voltage.

14. A map data writing device, comprising:
a vehicle-mounted control device that controls an operation of a device that is mounted in a vehicle on the basis of map data; and
a relay device that receives update map data, which is transmitted from an external center, of the vehicle-mounted control device in a memory,
wherein the vehicle-mounted control device and the relay device are connected through a vehicle-mounted network,
wherein the relay device includes a battery voltage check circuit configured to perform a battery voltage check of a battery voltage in a no-load state and a load-connected state before writing the update map data in the vehicle-mounted control device, and
wherein the writing of the update map data in the vehicle-mounted control device is performed when (i) the battery voltage is equal to or greater than a first reference voltage in the no-load state, or (ii) the battery voltage is equal to or greater than a second reference voltage in the load-connected state, the first reference voltage different from the second reference voltage.

15. A vehicle-mounted program writing device, comprising:
a plurality of vehicle-mounted control devices which control an operation of a device that is mounted in a vehicle with a control program;
a relay device that receives update program data which includes an update program and update data of the vehicle-mounted control device and is transmitted from an external center, and stores the update program data in a memory; and
a battery voltage check device,
wherein the vehicle-mounted control device, the relay device, and the battery voltage check device are connected through a vehicle-mounted network,
the battery voltage check device includes a battery voltage check circuit,
the battery voltage check circuit performs battery voltage check of a battery voltage in a no-load state and a load-connected state, and transmits a battery state signal, which indicates whether the battery voltage is equal to or greater than a first reference voltage in the no-load state or equal to or greater than a second reference voltage in the load-connected state, to the vehicle-mounted network, the first reference voltage different from the second reference voltage, and
the relay device performs writing responsive to the received battery state signal indicating that the battery voltage is equal to or greater than the first reference voltage in the no-load state or equal to or greater than the second reference voltage in the load-connected state.

16. The vehicle-mounted program writing device according to claim 1,
wherein the relay device has vehicle-mounted battery voltage check function of turning on a memory storage completion display unit in the vehicle when reception of the update program data of the plurality of vehicle-mounted control devices from the external center is completed, and notifying the external center of memory storage completion.

17. The vehicle-mounted program writing device according to claim 16,
wherein the plurality of vehicle-mounted control devices include a unit that notifies the relay device of writing completion after completion of writing of the update program and the update data, and
the relay device turns on a writing completion display unit in the vehicle after receiving writing completion notification from all of the plurality of vehicle-mounted control devices, and notifies the external center of the update completion.

18. The vehicle-mounted program writing device according to claim 1,
wherein the plurality of vehicle-mounted control devices include a unit that notifies the relay device of writing completion after completion of writing of the update program and the update data, and
the relay device turns on a writing completion display unit in the vehicle after receiving writing completion notification from all of the plurality of vehicle-mounted control devices, and notifies the external center of the update completion.

19. The vehicle-mounted program writing device according to claim 2,
wherein the relay device has vehicle-mounted battery voltage check function of turning on a memory storage completion display unit in the vehicle when reception of the update program data of the plurality of vehicle-mounted control devices from the external center is completed, and notifying the external center of memory storage completion.

20. The vehicle-mounted program writing device according to claim 19,
wherein the plurality of vehicle-mounted control devices include a unit that notifies the relay device of writing completion after completion of writing of the update program and the update data, and
the relay device turns on a writing completion display unit in the vehicle after receiving writing completion notification from all of the plurality of vehicle-mounted control devices, and notifies the external center of the update completion.

21. The vehicle-mounted program writing device according to claim 2,
wherein the plurality of vehicle-mounted control devices include a unit that notifies the relay device of writing completion after completion of writing of the update program and the update data, and
the relay device turns on a writing completion display unit in the vehicle after receiving writing completion notification from all of the plurality of vehicle-mounted control devices, and notifies the external center of the update completion.

22. The vehicle-mounted program writing device according to claim 3,
wherein the relay device has vehicle-mounted battery voltage check function of turning on a memory storage completion display unit in the vehicle when reception of the update program data of the plurality of vehicle-mounted control devices from the external center is completed, and notifying the external center of memory storage completion.

23. The vehicle-mounted program writing device according to claim 22,
wherein the plurality of vehicle-mounted control devices include a unit that notifies the relay device of writing completion after completion of writing of the update program and the update data, and
the relay device turns on a writing completion display unit in the vehicle after receiving writing completion notification from all of the plurality of vehicle-mounted control devices, and notifies the external center of the update completion.

24. The vehicle-mounted program writing device according to claim 3,
wherein the plurality of vehicle-mounted control devices include a unit that notifies the relay device of writing completion after completion of writing of the update program and the update data, and
the relay device turns on a writing completion display unit in the vehicle after receiving writing completion notification from all of the plurality of vehicle-mounted control devices, and notifies the external center of the update completion.

25. The vehicle-mounted program writing device according to claim 4,
wherein the relay device has vehicle-mounted battery voltage check function of turning on a memory storage completion display unit in the vehicle when reception of the update program data of the plurality of vehicle-mounted control devices from the external center is completed, and notifying the external center of memory storage completion.

26. The vehicle-mounted program writing device according to claim 25,
wherein the plurality of vehicle-mounted control devices include a unit that notifies the relay device of writing completion after completion of writing of the update program and the update data, and
the relay device turns on a writing completion display unit in the vehicle after receiving writing completion notification from all of the plurality of vehicle-mounted control devices, and notifies the external center of the update completion.

27. The vehicle-mounted program writing device according to claim 4,
wherein the plurality of vehicle-mounted control devices include a unit that notifies the relay device of writing completion after completion of writing of the update program and the update data, and
the relay device turns on a writing completion display unit in the vehicle after receiving writing completion notification from all of the plurality of vehicle-mounted control devices, and notifies the external center of the update completion.

28. The vehicle-mounted program writing device according to claim 5,
wherein the relay device has vehicle-mounted battery voltage check function of turning on a memory storage completion display unit in the vehicle when reception of the update program data of the plurality of vehicle-mounted control devices from the external center is completed, and notifying the external center of memory storage completion.

29. The vehicle-mounted program writing device according to claim 28,
wherein the plurality of vehicle-mounted control devices include a unit that notifies the relay device of writing completion after completion of writing of the update program and the update data, and
the relay device turns on a writing completion display unit in the vehicle after receiving writing completion notification from all of the plurality of vehicle-mounted control devices, and notifies the external center of the update completion.

30. The vehicle-mounted program writing device according to claim 5,
wherein the plurality of vehicle-mounted control devices include a unit that notifies the relay device of writing completion after completion of writing of the update program and the update data, and
the relay device turns on a writing completion display unit in the vehicle after receiving writing completion notification from all of the plurality of vehicle-mounted control devices, and notifies the external center of the update completion.

31. The vehicle-mounted program writing device according to claim 6,
wherein the relay device has vehicle-mounted battery voltage check function of turning on a memory storage completion display unit in the vehicle when reception of the update program data of the plurality of vehicle-mounted control devices from the external center is completed, and notifying the external center of memory storage completion.

32. The vehicle-mounted program writing device according to claim 31,
wherein the plurality of vehicle-mounted control devices include a unit that notifies the relay device of writing completion after completion of writing of the update program and the update data, and
the relay device turns on a writing completion display unit in the vehicle after receiving writing completion notification from all of the plurality of vehicle-mounted control devices, and notifies the external center of the update completion.

33. The vehicle-mounted program writing device according to claim 6,
wherein the plurality of vehicle-mounted control devices include a unit that notifies the relay device of writing completion after completion of writing of the update program and the update data, and
the relay device turns on a writing completion display unit in the vehicle after receiving writing completion notification from all of the plurality of vehicle-mounted control devices, and notifies the external center of the update completion.

34. The vehicle-mounted program writing device according to claim 7,
wherein the plurality of vehicle-mounted control devices include a unit that notifies the relay device of writing completion after completion of writing of the update program and the update data, and
the relay device turns on a writing completion display unit in the vehicle after receiving writing completion notification from all of the plurality of vehicle-mounted control devices, and notifies the external center of the update completion.

\* \* \* \* \*